United States Patent
Zhou et al.

(10) Patent No.: US 12,238,552 B2
(45) Date of Patent: Feb. 25, 2025

(54) RS TX/RX CONFIGURATION FOR INTER-BASE STATION CLI MEASUREMENT

(71) Applicant: QUALCOMM Incorporated, San Diego, CA (US)

(72) Inventors: Yan Zhou, San Diego, CA (US); Qian Zhang, Basking Ridge, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 17/654,789

(22) Filed: Mar. 14, 2022

(65) Prior Publication Data
US 2023/0292153 A1   Sep. 14, 2023

(51) Int. Cl.
*H04W 24/08*   (2009.01)

(52) U.S. Cl.
CPC .................................. *H04W 24/08* (2013.01)

(58) Field of Classification Search
CPC ..... H04W 24/08; H04W 92/20; H04W 24/02; H04L 5/0092; H04L 5/0048
See application file for complete search history.

(56) References Cited

U.S. PATENT DOCUMENTS

| | | | | |
|---|---|---|---|---|
| 2015/0189666 A1* | 7/2015 | Wang | .................... | H04W 72/54 |
| | | | | 370/329 |
| 2015/0304868 A1* | 10/2015 | Yu | ....................... | H04W 56/001 |
| | | | | 370/312 |
| 2018/0323887 A1* | 11/2018 | Azarian Yazdi | ...... | H04W 24/08 |
| 2019/0312619 A1* | 10/2019 | Abedini | ............... | H04B 7/0695 |
| 2019/0342057 A1* | 11/2019 | Rico Alvarino | ...... | H04W 72/52 |
| 2020/0112420 A1* | 4/2020 | Xu | ........................ | H04L 5/0073 |
| 2021/0099984 A1* | 4/2021 | Liu | ........................ | H04W 72/12 |
| 2021/0195674 A1* | 6/2021 | Park | ..................... | H04W 76/18 |

(Continued)

FOREIGN PATENT DOCUMENTS

| | | |
|---|---|---|
| WO | 2020143477 A1 | 7/2020 |
| WO | 2020164126 A1 | 8/2020 |
| WO | 2021248397 A1 | 12/2021 |

OTHER PUBLICATIONS

International Search Report and Written Opinion—PCT/US2023/013053—ISA/EPO—May 11, 2023.

*Primary Examiner* — Tejis Daya
(74) *Attorney, Agent, or Firm* — Procopio, Cory, Hargreaves & Savitch

(57) ABSTRACT

A first network node may transmit, to one or more second network nodes, one or more first reference signals. The first network node may receive, from one or more third network nodes, one or more second reference signals. The first network node may measure a CLI level associated with at least one third network node in the one or more third network nodes based on the one or more second reference signals. In one or more configurations, the first network node may receive, from a network entity different from the first network node, a configuration associated with the transmission of the one or more first reference signals or the reception of the one or more second reference signals. In one or more configurations, the one or more second network nodes and the one or more third network nodes may or may not include at least one same network node.

29 Claims, 16 Drawing Sheets

(56) References Cited

U.S. PATENT DOCUMENTS

| | | | |
|---|---|---|---|
| 2021/0219155 A1* | 7/2021 | Ye .......................... | H04L 5/0048 |
| 2022/0030456 A1* | 1/2022 | Sundberg ............. | H04B 17/336 |
| 2023/0379107 A1* | 11/2023 | Zhang .................. | H04B 17/345 |

* cited by examiner

RS TX/RX CONFIGURATION FOR INTER-BASE STATION CLI MEASUREMENT

TECHNICAL FIELD

The present disclosure relates generally to communication systems, and more particularly, to measurement of cross link interference (CLI) between network nodes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first network node. The apparatus may transmit, to one or more second network nodes, one or more first reference signals. The apparatus may receive, from one or more third network nodes, one or more second reference signals. The apparatus may measure a cross link interference (CLI) level associated with at least one third network node in the one or more third network nodes based on the one or more second reference signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
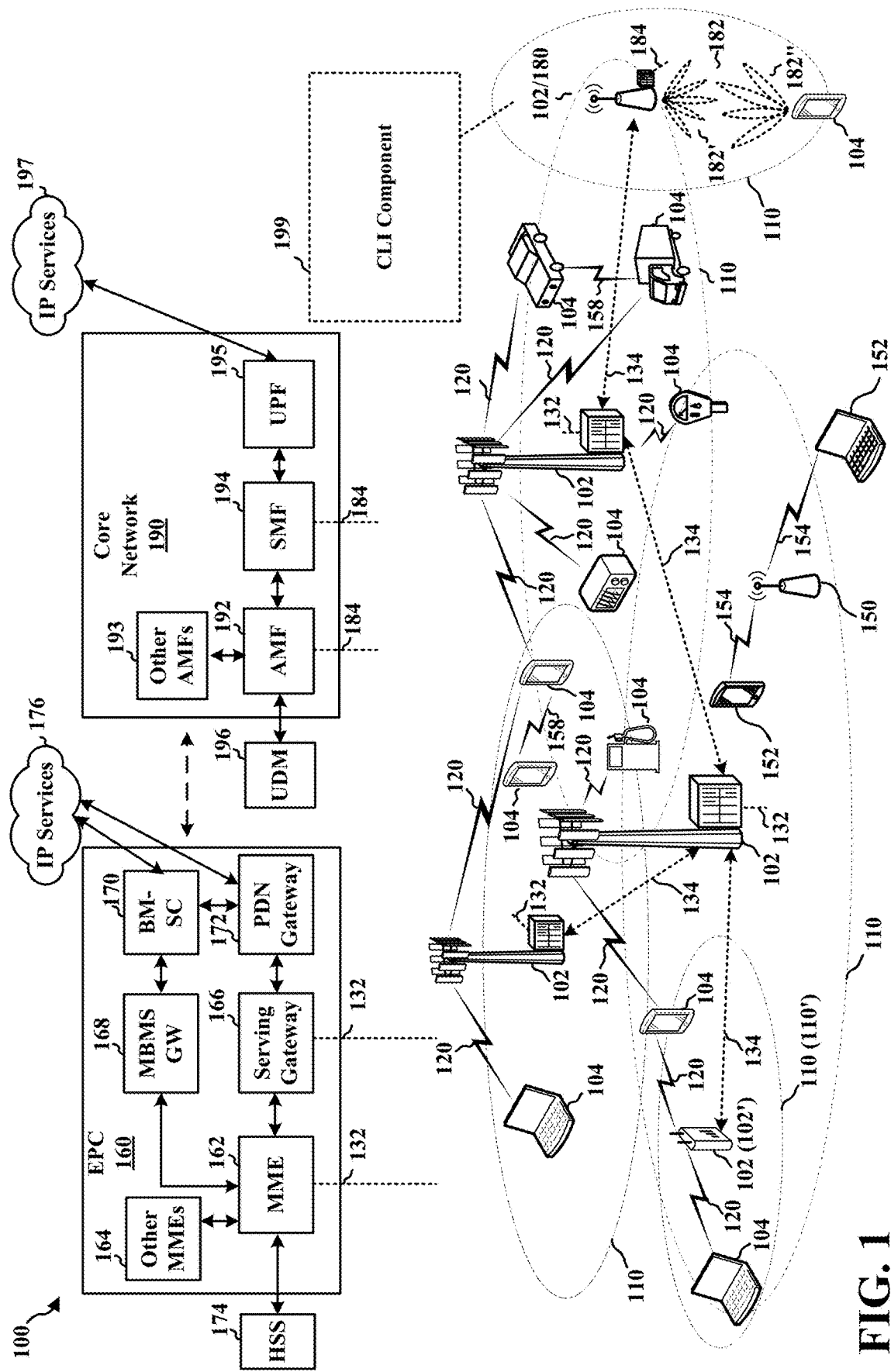
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station/network node 180 may include a CLI component 199 that may be configured to transmit, to one or more second network nodes, one or more first reference signals. The CLI component 199 may be configured to receive, from one or more third network nodes, one or more second reference signals. The CLI component 199 may be configured to measure a CLI level associated with at least one third network node in the one or more third network nodes based on the one or more second reference signals. Although the following description may be focused on 5G NR, the concepts described herein may be applicable to other similar areas, such as LTE, LTE-A, CDMA, GSM, and other wireless technologies.

Figure 2:
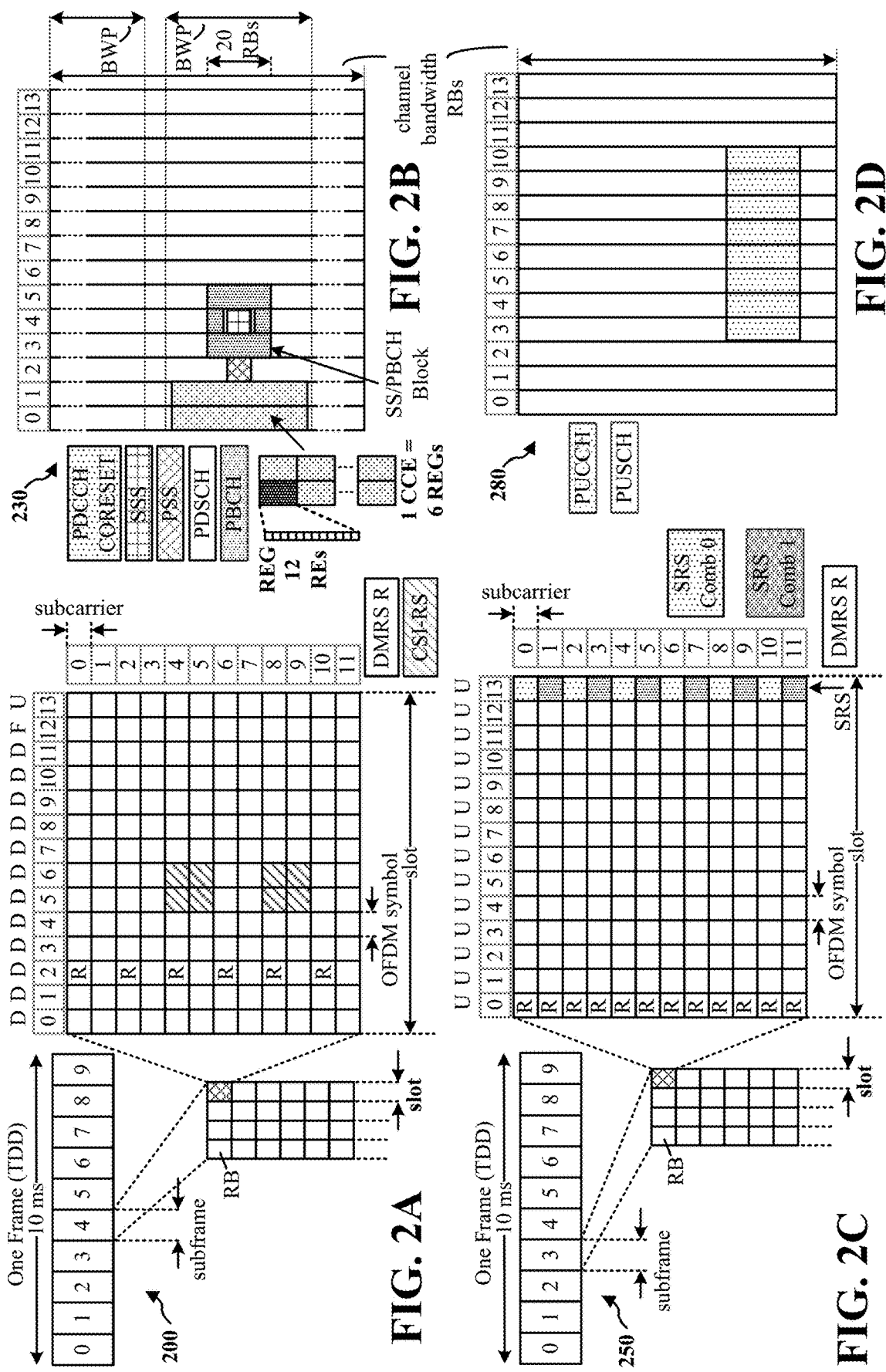
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
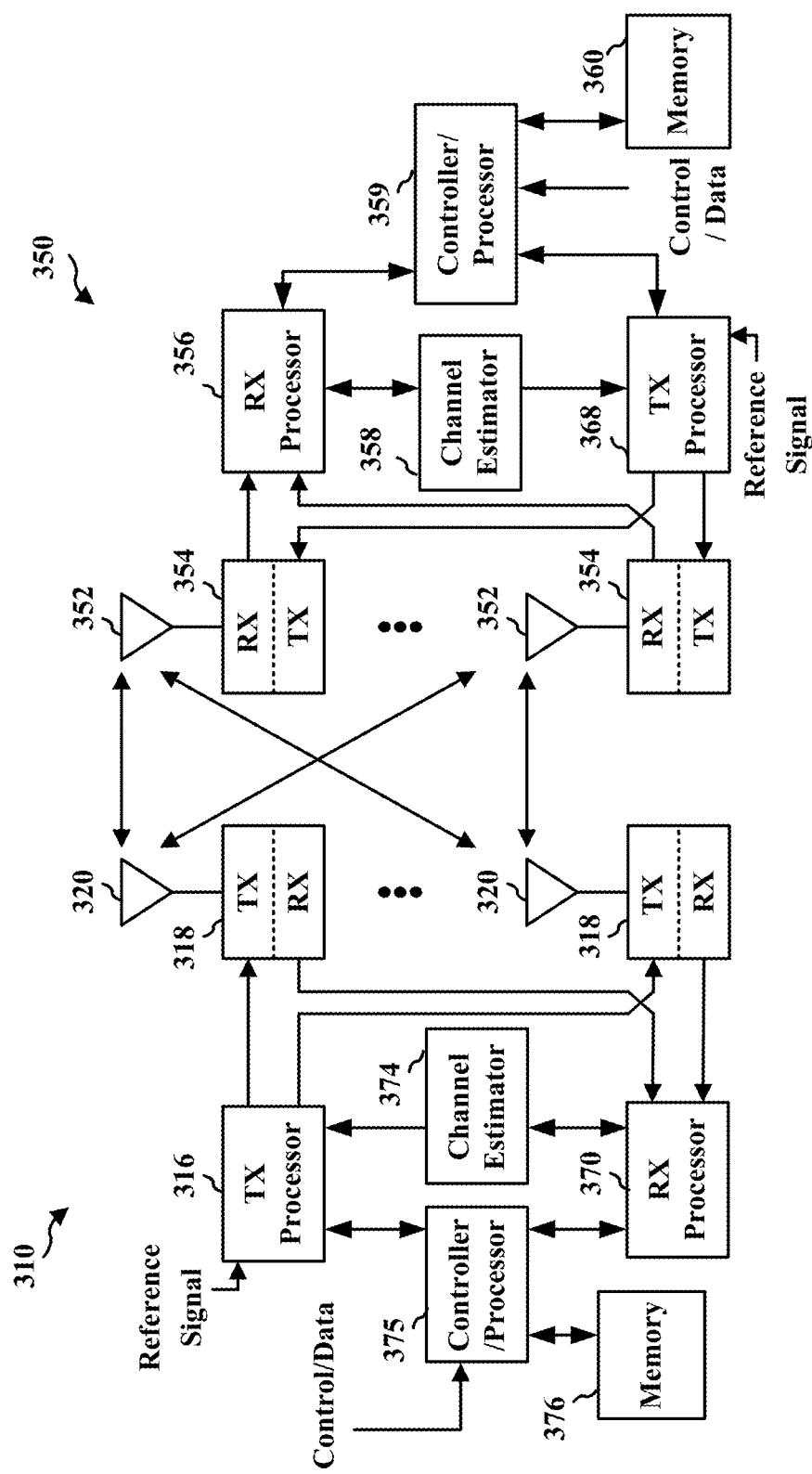
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

Herein a network node can be implemented as an aggregated base station, as a disaggregated base station, an integrated access and backhaul (IAB) node, a relay node, a sidelink node, etc. A network node/entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

Figure 4:
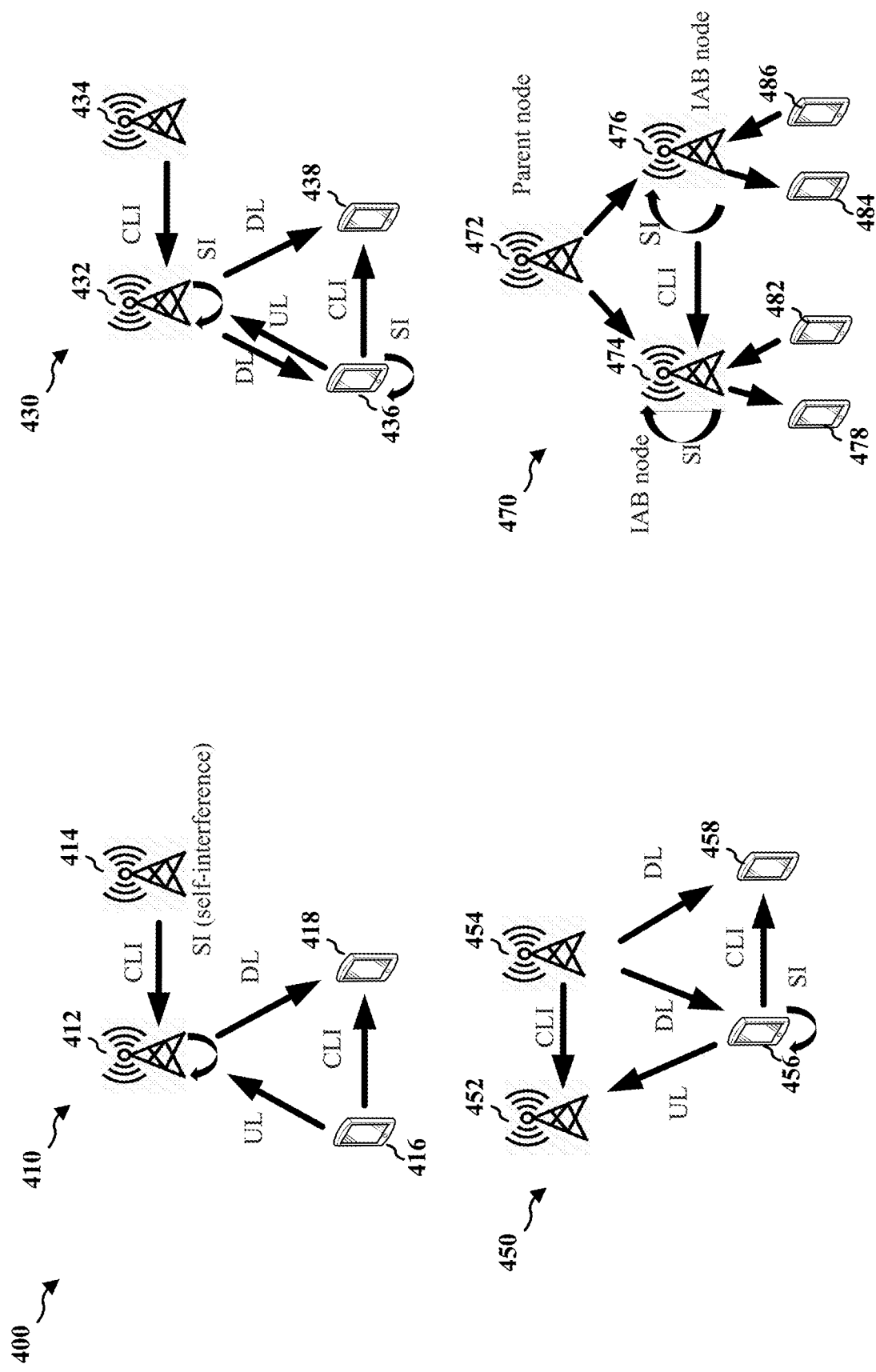
FIG. 4 is a diagram 400 illustrating various example deployment scenarios including one or more full-duplex devices.

FIG. 4 is a diagram 400 illustrating various example deployment scenarios including one or more full-duplex devices. A full-duplex device (or a device working in a full-duplex mode) may transmit and receive at the same time. The diagram 410 illustrates an example deployment scenario including at least one full-duplex network node and two half-duplex UEs. Operating in the full-duplex mode, a first network node 412 may transmit to a second UE 418 and receive from a first UE 416 at the same time. The full-duplex operation may create self-interference (SI) at the first network node 412. In particular, at the first network node 412, the downlink transmission to the second UE 418 may cause interference to the uplink reception from the first UE 416. Further, the uplink transmission by the first UE 416 to the first network node 412 may cause cross link interference (CLI) to the downlink reception by the second UE 418 from the first network node 412. Moreover, a transmission from a second network node 414 may cause CLI to the uplink reception at the first network node 412. One or more aspects herein may relate to measuring CLI levels between network nodes, such as the level of CLI caused by the second network node 414 to the uplink reception at the first network node 412.

The diagram 430 illustrates an example deployment scenario including at least one full-duplex network node and at least one full-duplex UE/customer premises equipment (CPE). A first network node 432 may communicate with a first UE/CPE 436 in the full-diplex mode. In other words, uplink and downlink transmissions may take place at the same time between the first network node 432 and the first UE/CPE 436. At the same time, the first network node 432 may transmit to a second UE/CPE 438. The downlink transmissions to both the first UE/CPE 436 and the second UE/CPE 438 may cause SI to the uplink reception from the first UE/CPE 436 at the first network node 432. Further, the uplink transmission from the first UE/CPE 436 may cause SI to the downlink reception at the first UE/CPE 436, and may cause CLI to the downlink reception at the second UE 438. Moreover, a transmission from a second network node 434 may cause CLI to the uplink reception at the first network node 432.

The diagram 450 illustrates an example deployment scenario including two half-duplex network nodes and at least one full-duplex UE/CPE. A first UE/CPE 456 may work in the full-duplex mode. In particular, the first UE/CPE 456 may transmit to a first network node 452 and receive from a second network node 454 at the same time. Accordingly, the uplink transmission from the first UE/CPE 456 to the first network node 452 may cause SI to the downlink reception at the first UE/CPE 456. Further, the second network node 454 may transmit to a second UE/CPE 458 at the same time the second network node 454 transmits to the first UE/CPE 456. The downlink transmissions from the second network node 454 to both the first UE/CPE 456 and the second UE/CPE 458 may cause CLI to the uplink reception at the first network node 452. Further, the uplink transmission from the first UE/CPE 456 to the first network node 452 may cause CLI to the downlink reception at the second UE/CPE 458.

The diagram 470 illustrates an example deployment scenario including two full-duplex integrated access and backhaul (IAB) nodes, a first IAB node 474 and a second IAB node 476 may share a parent node 472. The first IAB node 474 and the second IAB node 476 may operate in the full-duplex mode. In particular, the first IAB node 474 may transmit to a first UE 478 and receive from a second UE 482 at the same time. The second IAB node 476 may transmit to a third UE 484 and receive from a fourth UE 486 at the same time. Accordingly, the downlink transmission to the first UE 478 may cause SI to the receptions (both from the second UE 482 and from the parent node 472) at the first IAB node 474. Similarly, the downlink transmission to the third UE 484 may cause SI to the receptions (both from the fourth UE 486 and from the parent node 472) at the second IAB node 476. Further, the downlink transmission by one of the first IAB node 474 or the second IAB node 476 may cause CLI to the receptions at the other of the first IAB node 474 or the second IAB node 476. In some configurations, the first IAB node 474 and/or the second IAB node 476 may have enhanced duplexing capability. For example, the first IAB node 474 and/or the second IAB node 476 may support single frequency full-duplex (SFFD) and frequency division multiplexing (FDM)/spatial division multiplexing (SDM) with RB group (RBG) granularity.

Figure 5:
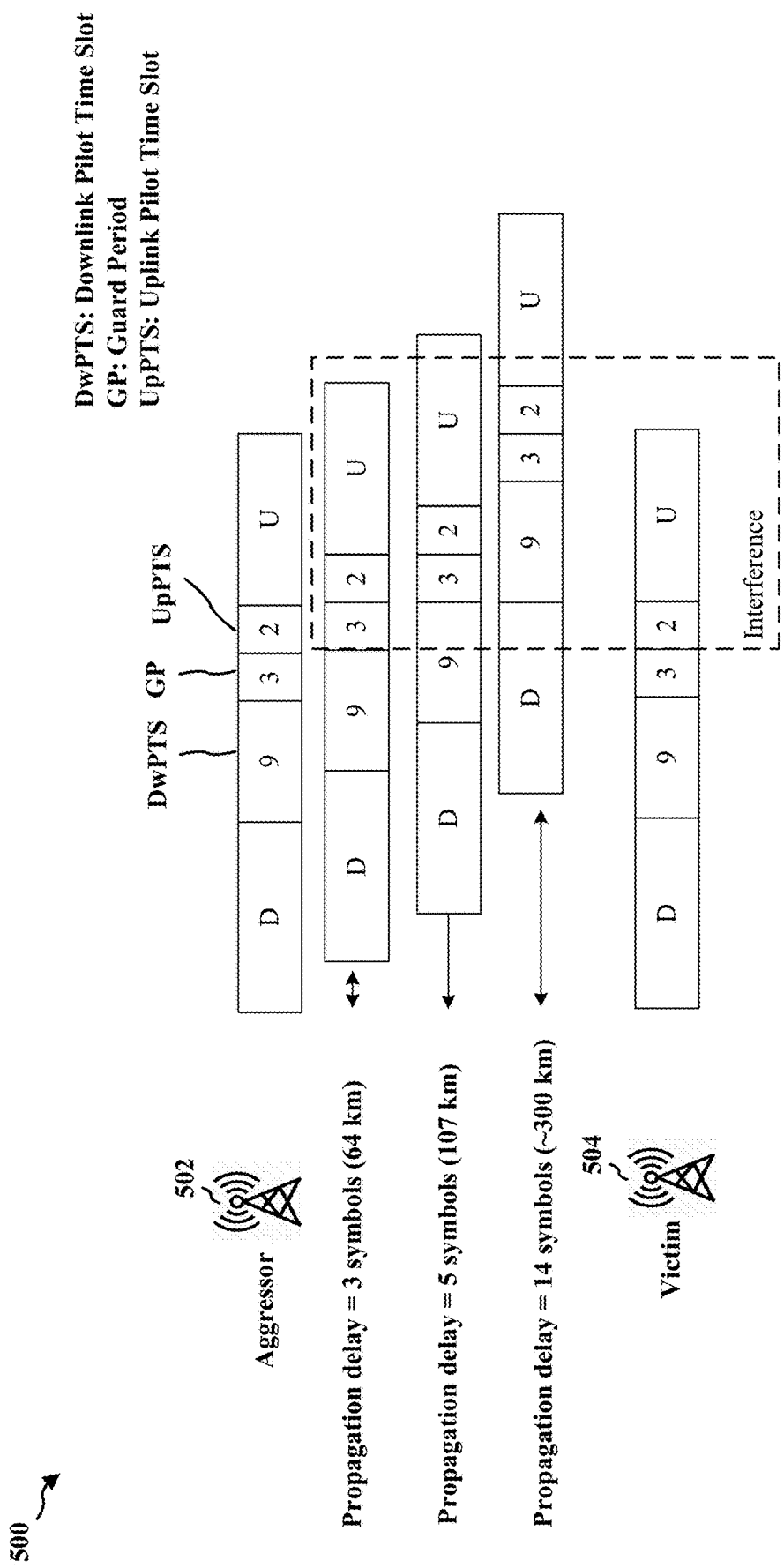
FIG. 5 is a diagram 500 illustrating CLI between two example network nodes caused by the atmosphere ducting effect.

FIG. 5 is a diagram 500 illustrating CLI between two example network nodes caused by the atmosphere ducting effect. Due to the atmosphere ducting effect, the downlink transmission from an aggressor network node 502 may propagate to a victim network node 504 that may be far away. Further, due to the distance between the aggressor network node 502 and the victim network node 504, the transmission from the aggressor network node 502 may arrive at the victim network node 504 with a significant propagation delay. As shown in FIG. 5, when the propagation delay may be equal to 3 symbols if the two network nodes are 64 km apart, 5 symbols if the two network nodes are 107 km apart, or 14 symbols if the two network nodes are 300 km apart. Therefore, although the timing may be aligned between the aggressor network node 502 and the victim network node 504 (e.g., both the aggressor network node 502 and the victim network node 504 may transmit at the same time, and may receive at the same time), the delayed arrival of the aggressor transmission at the victim network node 504 may cause CLI to the uplink reception at the victim network node 504.

In one or more configurations, the remote interference management (RIM) framework may be used to mitigate the inter-network node interference caused by the atmosphere ducting effect. If multiple neighboring network nodes operate in the half-duplex mode, timing may be aligned between the network nodes such that a network node may not transmit while a neighboring network node is receiving. Accordingly, absent the atmosphere ducting effect, the CLI between neighboring network nodes operating in the half-duplex mode may be minimal. However, the CLI may be significant between neighboring network nodes operating in the full-duplex mode because a network node operating in the full-duplex mode may not time its transmission so that it does not take place while a neighboring network node is receiving. The RIM may not optimize a selected network node beam to mitigate inter-network node interference caused by a network node operating in the full-duplex mode. In fact, the RIM procedure may be deactivated in the absence of the atmosphere ducting effect.

One or more aspects of the disclosure may relate to one or more scheduling configurations for transmission and/or reception of reference signals for inter-network node CLI measurement.

Figure 6:
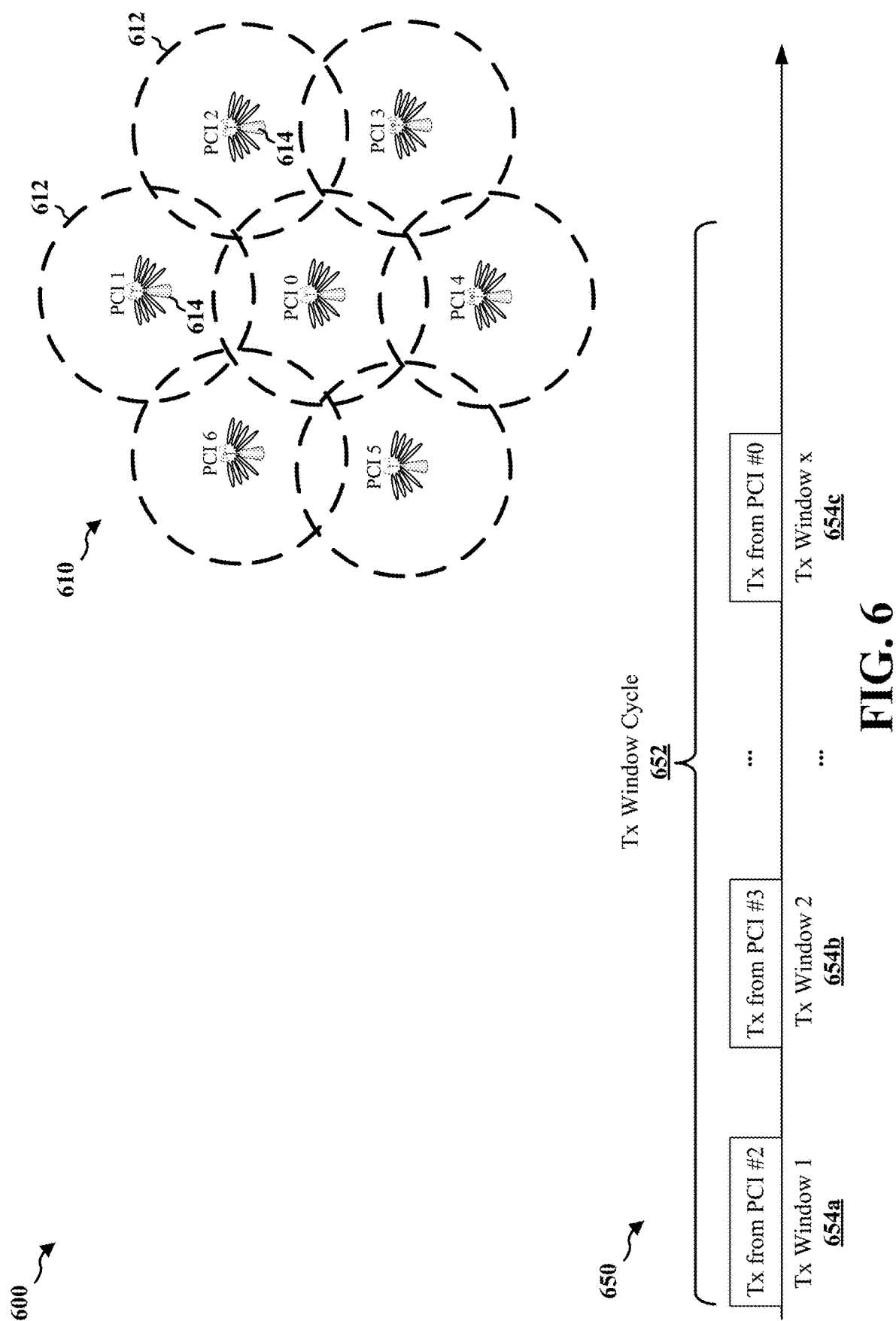
FIG. 6 is a diagram illustrating an example scheduling configuration for transmission and/or reception of reference signals for inter-network node CLI measurement according to one or more aspects.

FIG. 6 is a diagram 600 illustrating an example scheduling configuration for transmission and/or reception of reference signals for inter-network node CLI measurement according to one or more aspects. The diagram 610 illustrates an example environment in which one or more aspects may be practiced. A plurality of neighboring network nodes 614 may enable, and may be associated with a plurality of (partially overlapping) cells 612. Each network node 614 may be associated with a respective cell 612. Further, each cell 612 or the associated network node 614 may be identified based on a PCI.

The diagram 650 illustrates an example scheduling configuration for transmission and/or reception of reference signals for inter-network node CLI measurement according to one or more aspects. The transmission and/or reception of reference signals for the inter-network node CLI measurement may take place over multiple cycles (transmit window cycles) 652. Each cycle 652 may further include multiple transmit (time) windows 654 (e.g., the transmit window #1 654a, the transmit window #2 654b, . . . , the transmit window #x 654c, etc.). Each transmit window in a cycle may be associated with a transmit window index or transmit window identifier (ID) (e.g., the transmit window #2 in the cycle, etc.). In one or more configurations, the transmission of reference signals across network nodes 614 may be time division multiplexed (TDMed) within each cycle 652 based on the transmit windows 654. In particular, during each transmit window 654, at most one network node (i.e., 0 or 1 network node) may transmit the reference signal. If a network node 614 transmits a reference signal during a transmit window 654, the same network node 614 may receive reference signals from other network nodes during the remaining transmit windows 654 within the same cycle 652. Such a configuration may be suitable or appropriate for network nodes 614 that may not transmit a reference signal while receiving a reference signal at the same time.

In one configuration, the transmit window 654 used by a network node 614 to transmit the reference signal may be selected by the network (e.g., another network entity, such as a central unit (CU) or an operations, administration and maintenance (OAM)). For example, the network may centrally select the respective transmit windows 654 for all the network nodes 614 participating in the inter-network node CLI measurement procedure. Once a transmit window (which may be associated with a transmit window index or transmit window ID) is selected for a network node 614 by the network, that network node 614 may use the same transmit window (i.e., the transmit window with the same transmit window index or transmit window ID) in the remaining cycles to transmit the reference signal.

In another configuration, the transmit window 654 used by a network node 614 to transmit the reference signal may be selected autonomously by the network node 614 itself. In other words, the transmit windows 654 may be taken up by the network nodes 614 participating in the inter-network node CLI measurement procedure in a distributed fashion. For example, in one cycle, each network node 614 participating in the inter-network node CLI measurement procedure may perform sensing (e.g., based on previous cycles), and may select one respective transmit window in the cycle for itself so that the network node 614 may transmit the reference signal during the transmit window it has selected for itself. Once a transmit window (which may be associated with a transmit window index or transmit window ID) is selected by a network node 614, that network node 614 may use the same transmit window (i.e., the transmit window with the same transmit window index or transmit window ID) in the remaining cycles to transmit the reference signal.

In one or more configurations, if the cell ID (e.g., the PCI) associated with a reference signal cannot be identified based on the reference signal itself, a network node 614 transmitting such a reference signal may inform the neighboring network nodes 614 participating in the inter-network node CLI measurement procedure about the transmit window (e.g., based on the transmit window index or the transmit window ID) during which the network node 614 transmits the reference signal, so that the neighboring network nodes 614 may associate the cell 612 and/or the network node 614 with the reference signal based on the transmit window used for the transmission of the reference signal.

Figure 7:
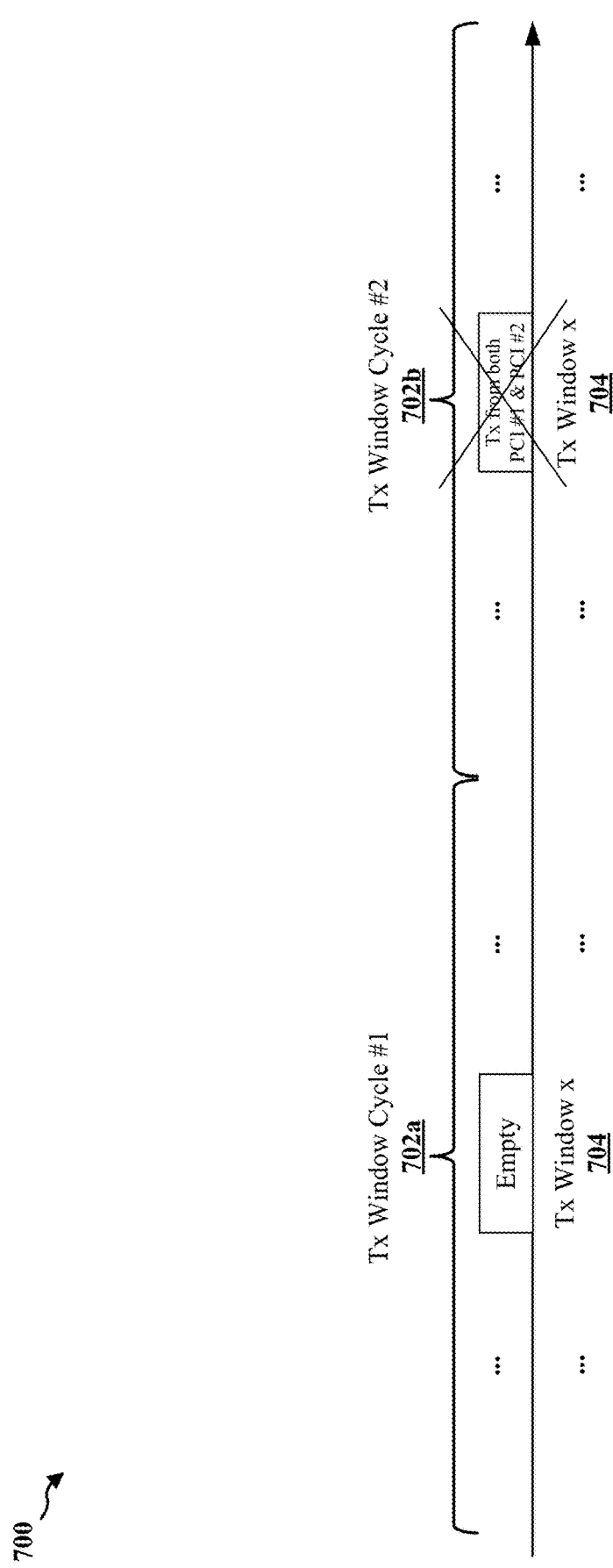
FIG. 7 is a diagram illustrates an example transmit window collision.

FIG. 7 is a diagram 700 illustrates an example transmit window collision. The network node 614 may select their own transmit windows in a distributed fashion. During the cycle #1 702a, a transmit window #x 704 may be unused by any of the network nodes 614 participating in the inter-network node CLI measurement procedure. Accordingly, based on the result of sensing performed in the cycle #1 702a, both network nodes 614 associated with PCI #1 and PCI #2 may select the transmit window #x 704 for themselves for the transmission of reference signals. Therefore, during the cycle #2 702b, both network nodes 614 associated with PCI #1 and PCI #2 may transmit reference signals during the transmit window #x 704, resulting in a collision. If the collision is not resolved, the collision may persist into following cycles.

Accordingly, in one or more configurations, once the transmit windows have been selected by the network nodes 614 in a distributed fashion, the network nodes 614 may exchange with each other the information about the respective selected transmit windows (e.g., respective transmit window indexes or transmit window IDs). In one example, the exchange of the information about the respective selected transmit windows may take place in the same cycle as the selection of the transmit windows. In some examples, the network nodes 614 may also exchange with each other their respective location information. In one or more configurations, a network node 614 may reselect a different transmit window if another network node in range has selected a same transmit window (and hence there may potentially be a collision).

Figure 8:
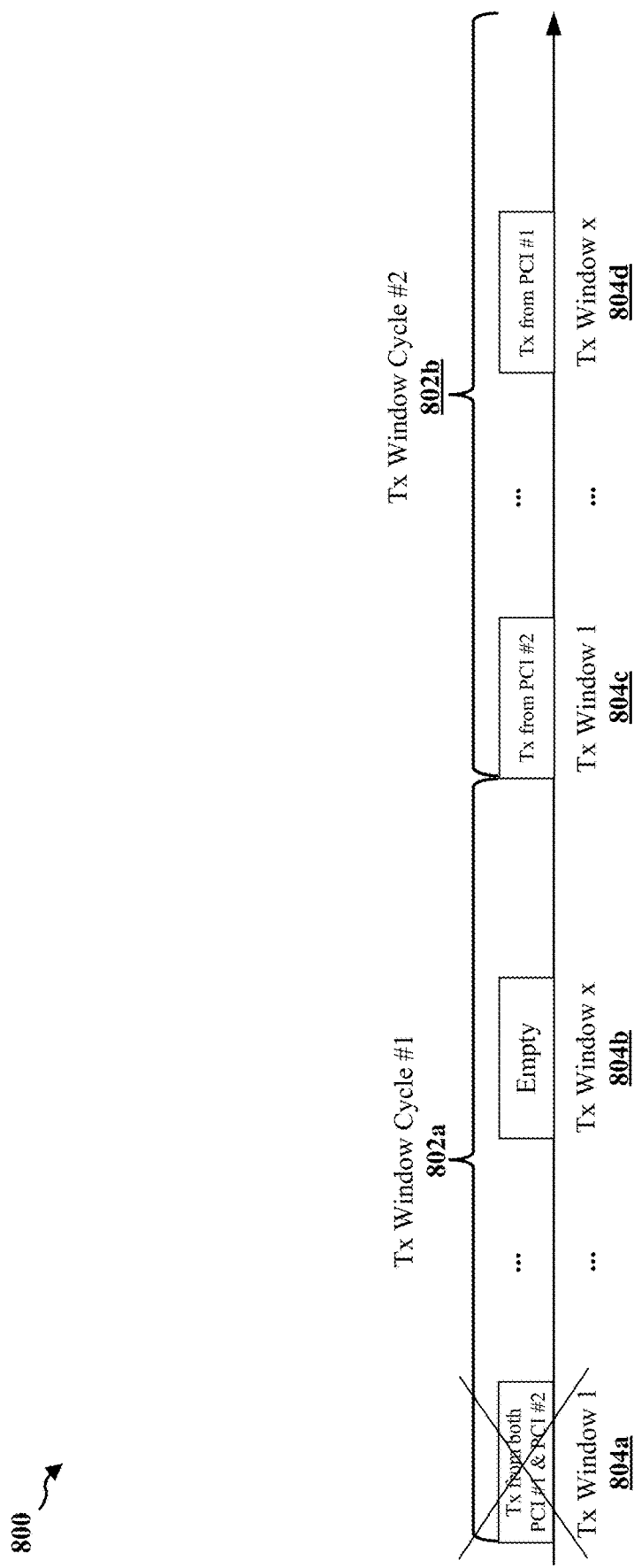
FIG. 8 is a diagram illustrating an example scheduling configuration for transmission and/or reception of reference signals for inter-network node CLI measurement according to one or more aspects.

FIG. 8 is a diagram 800 illustrating an example scheduling configuration for transmission and/or reception of reference signals for inter-network node CLI measurement according to one or more aspects. In one or more configurations, each network node 614 may, in each cycle, randomly selected a transmit window in the cycle for its transmission of a reference signal. In the remaining transmit windows not selected by a network node 614, the network node 614 may receive reference signals from other neighboring network nodes.

Because the transmit windows are randomly selected by the network nodes 614 in a distributed fashion, two network nodes 614 may select a same transmit window to transmit the reference signal in a cycle, resulting in a collision. However, because the transmit windows are randomly reselected by the network nodes 614 in each cycle, a collision in one cycle may not persist into following cycles. For example, as shown in FIG. 8, in the cycle #1 802a, based on a random process, both network nodes 614 associated PCI #1 and PCT #2 may select the same transmit window #1 804a for the transmission of the respective reference signal, resulting in a collision at the transmit window #1 804a. Within the same cycle #1 802a, the transmit window #x 804b may be unused by any network node 614. Then, during the following cycle, the cycle #2 802b, again based on a random process, the network node associated with PCI #1 may select the transmit window #x 804d to transmit the reference signal, and the network node associated with PCI #2 may select the transmit window #1 804c to transmit the reference signal. In other words, the collision at the transmit window #1 804a in the cycle #1 802a may not persist into the cycle #2 802b. Accordingly, even though the transmit windows may be selected randomly in a distributed fashion, given a sufficiently large number of consecutive cycles 802, it may be highly likely that each network node 614 may be able to measure at least one reference signal from each of its neighboring network nodes 614 in range participating in the inter-network node CLI measurement procedure.

In one or more configurations, across a number of consecutive cycles 802, a network node 614 may use a highest measured signal strength (e.g., a received signal strength indicator (RSSI) or a reference signal received power (RSRP)) associated with a beam of a neighboring network node 614 as the result for that neighboring network node 614.

In one or more configurations, if a network node 614 receives multiple reference signals from multiple neighboring network nodes 614 where the multiple reference signals may at least partly overlap in time (e.g., transmitted and received in a same transmit window), the network node 614 may distinguish between the reference signals that are received from the multiple neighboring network nodes 614.

Figure 9:
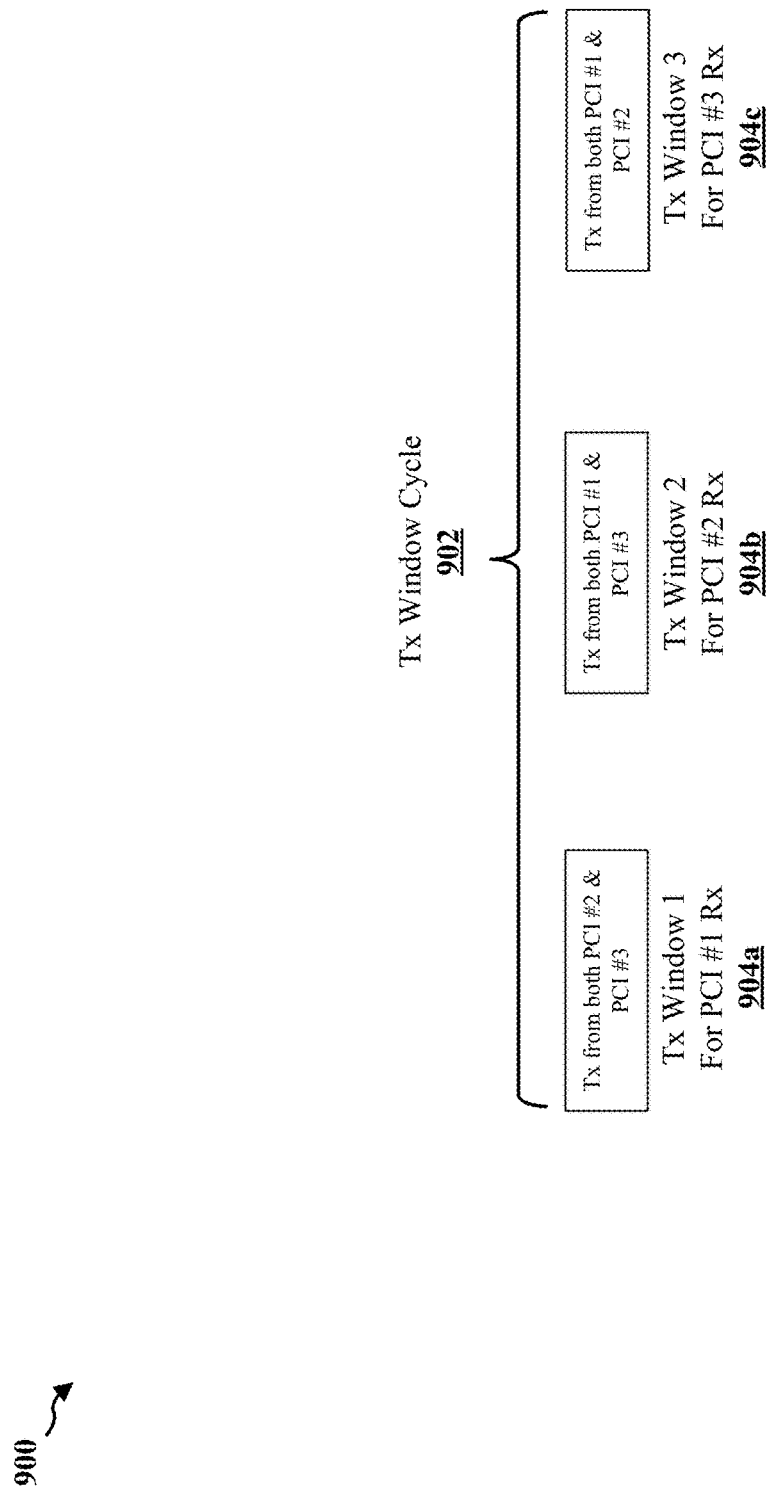
FIG. 9 is a diagram illustrating an example scheduling configuration for transmission and/or reception of reference signals for inter-network node CLI measurement according to one or more aspects.

FIG. 9 is a diagram 900 illustrating an example scheduling configuration for transmission and/or reception of reference signals for inter-network node CLI measurement according to one or more aspects. In one or more configurations, within each cycle, multiple network nodes 614 may transmit and receive reference signals for inter-network node CLI measurement based on TDMed receive windows. Herein a receive window for a network node 614 may refer to a transmit window during which the network node 614 may receive reference signals from other neighboring network nodes 614 but may not transmit a reference signal. At most one network node 614 (i.e., 0 or 1 network node 614) may receive reference signals from neighboring network nodes 614 during each receive window. A network node 614 may transmit reference signals in remaining transmit windows (which may be receive windows for other network nodes 614) in the cycle.

As shown in FIG. 9, in the cycle 902, the transmit window #1 904a may be the receive window for the network node 614 associated with PCI #1. Therefore, during the transmit window #1 904a, the network node 614 associated with PCI #1 may receive reference signals from other neighboring network nodes 614 (e.g., the network nodes 614 associated with PCI #2 and PCI #3). Network nodes 614 that are not the network node 614 associated with PCI #1 (e.g., the network nodes 614 associated with PCI #2 and PCI #3) may transmit reference signals during the transmit window #1 904a. The network node 614 associated with PCI #1 may transmit reference signals during each of the reminding transmit windows (e.g., the transmit window #2 904b and the transmit window #3 904c) in the cycle 902. Similarly, the transmit window #2 904b may be the receive window for the network node 614 associated with PCI #2, and the transmit window #3 904c may be the receive window for the network node 614 associated with PCI #3. Accordingly, the network node 614 associated with PCI #2 may transmit reference signals during the transmit window #1 904a and the transmit window #3 904c, and may receive reference signals during the transmit window #2 904b. Similarly, the network node 614 associated with PCI #3 may transmit reference signals during the transmit window #1 904a and the transmit window #2 904b, and may receive reference signals during the transmit window #3 904c.

One advantage associated with this approach may be that multiple transmitting network nodes 614 may align the receive timing at the receiving network node 614 (i.e., the single receiving network node associated with the current receive window), such that the reference signals that specify a known receive timing may be used for the inter-network node CLI measurement. Such reference signals may include, e.g., CSI-RS or SRS.

In one or more configurations, in each cycle, each network node 614 may randomly select its receive window. In other words, in each cycle, the network nodes 614 may randomly select the respective receive windows in a distributed fashion (e.g., to avoid potential receive window collision). During a receive window for a network node 614, the network node 614 may receive reference signals from neighboring network nodes 614. Further, the network node 614 may transmit reference signal in the remaining transmit windows in the cycle that are not the receive window for the network node. Even though the receive windows may be selected randomly in a distributed fashion, given a sufficiently large number of consecutive cycles 902, it may be highly likely that each network node 614 may be able to measure at least one reference signal from each of its neighboring network nodes 614 in range participating in the inter-network node CLI measurement procedure.

Figure 10:
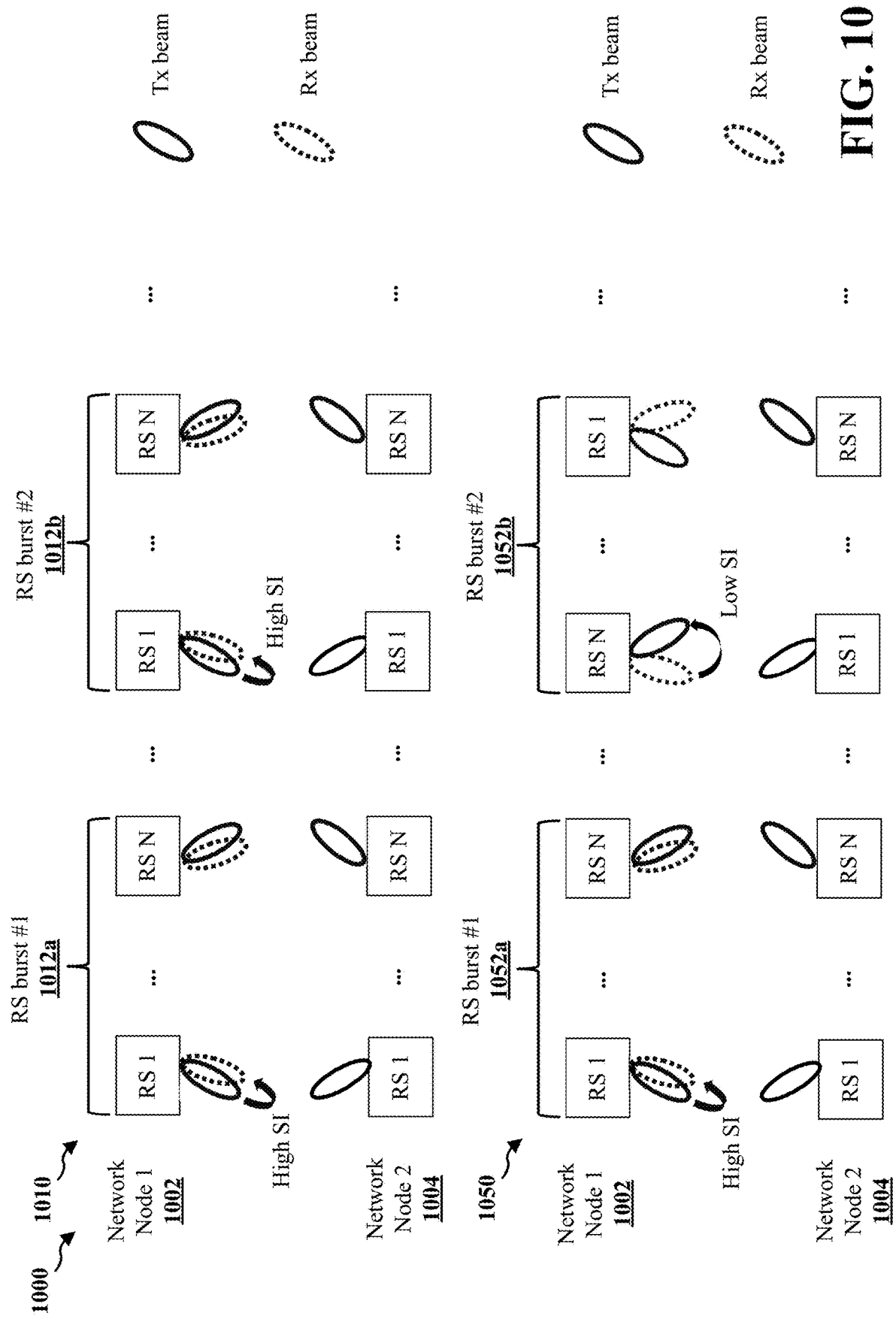
FIG. 10 is a diagram illustrating an example scheduling configuration for transmission and/or reception of reference signals for inter-network node CLI measurement according to one or more aspects.

FIG. 10 is a diagram 1000 illustrating an example scheduling configuration for transmission and/or reception of reference signals for inter-network node CLI measurement according to one or more aspects. In one or more configurations, network nodes 614 may transmit and receive reference signals at the same time (simultaneously) for CLI measurement. In particular, during a reference signal burst (also referred to as a reference signal burst cycle), a network node 614 may transmit reference signals to neighboring network nodes 614 while at the same time receiving reference signals from the neighboring network nodes 614.

For example, to measure the CLI between all transmit and receive beam pairs, a network node #1 1002 may sweep receive beams for the transmit beams of a network node #2 1004 in multiple reference signal bursts. For example, the network node #1 1002 may sweep receive beams to measure the reference signal #1 (RS1) from the network node #2 1004 in the reference signal burst #1 1012a and the reference signal burst #2 1012b.

If a transmit beam and a receive beam of a network node 614 are near to each other and are active at the same time, the receive beam may not accurately measure the reference signal from a neighboring network node 614 due to the strong SI caused by the transmit beam. Therefore, as shown in the diagram 1010, if a transmit beam and a receive beam of a network node #1 1002 are near to each other and are active at the same time during a reference signal burst, and if the beam sweeping orders for the transmit beams and the receive beams remain the same across all reference signal bursts, as a result of the SI described above, at least one transmit beam of a neighboring network node 614 (e.g., the network node #2 1004) may never be accurately measured.

Accordingly, in one or more configurations, a network node 614 (e.g., the network node #1 1002) may vary the beam sweeping order for either the transmit beams or the receive beams, so that for each receive beam, in at least one reference signal burst, the receive beam may experience a sufficiently low or no SI caused by any transmit beam of the same network node, and may measure the transmit beam of the neighboring network node (e.g., the network node #2 1004). In the diagram 1050, during the reference signal burst #1 1052a, based on the beam sweeping orders used, the receive beams of the network node #1 1002 may experience a high SI from the transmit beams of the network node #1 1002. Therefore, using the reference signal burst #1 1052a, due to the high SI, the network node #1 1002 may not be able to accurately measure at least one transmit beam of the network node #2 1004. Accordingly, during the reference signal burst #2 1052b, the network node #1 1002 may change the beam sweeping order of the transmit beams (i.e., use a different beam sweeping order for the transmit beams), such that the receive beams of the network node #1 1002 may accurately measure the transmit beams of the network node #2 1004 with a sufficiently low or no SI.

In one or more configurations, if a network node 614 (e.g., the network node #1 1002) varies a beam sweeping order for transmit beams across reference signal bursts (which may be periodic), the network node 614 may inform neighboring network nodes 614 participating in the inter-network node CLI measurement procedure about the changed beam sweeping order, such that the neighboring network nodes 614 may know the active transmit beam for each occasion.

Figure 11:
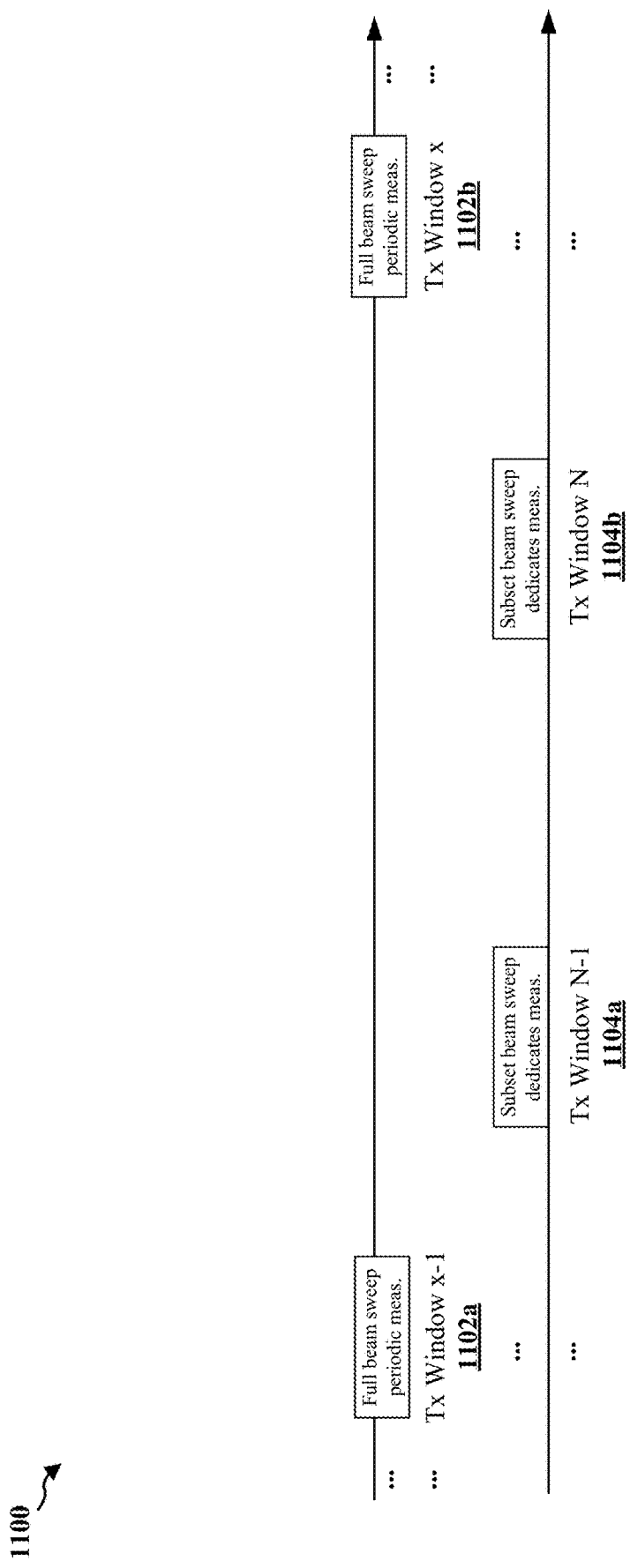
FIG. 11 is a diagram illustrating an example scheduling configuration for transmission and/or reception of reference signals for inter-network node CLI measurement according to one or more aspects.

FIG. 11 is a diagram 1100 illustrating an example scheduling configuration for transmission and/or reception of reference signals for inter-network node CLI measurement according to one or more aspects. In one or more configurations, CLI measurement for a subset of neighboring network nodes 614 may be performed based on dedicated inter-network node CLI reference signal measurements. In particular, instead of the periodic full measurements based on sweeping the transmit beams and the receive beams, which may include measurements for all neighboring network nodes 614 in range, as described in detail above, at least one dedicated inter-network node CLI measurement session may be configured or triggered between a network node that may transmit reference signals and a subset of its neighboring network nodes for a subset of transmit beams or receive beams of the reference signal-transmitting network node.

In some examples, the subset of neighboring network nodes for which measurements are performed in the dedicated inter-network node CLI measurement session may correspond to those neighboring network nodes that may be associated with non-compatible beam pairs in relation to the reference signal-transmitting network node in the full beam sweep-based measurements (which may be performed with a low duty cycle/less frequently). A beam pair including a transmit beam and a receive beam may be non-compatible when the transmit beam of a first network node creates high inter-node interference (e.g., greater than a threshold) to the receive beam of the second network node. Further, in one or more configurations, the subset of transmit beams or receive beams to be measured in the dedicated inter-network node CLI reference signal measurement session may correspond to the non-compatible beam pairs.

In FIG. 11, periodic full beam sweep-based measurement sessions may be performed during a transmit window #x−1 1102a and a transmit window x 1102b (e.g., with a low duty cycle). To supplement the periodic full beam sweep-based measurement sessions, dedicated inter-network node CLI measurement sessions may be performed during a transmit window #N−1 1104a and a transmit window N 1104b. In particular, the subset of neighboring network nodes to be measured in the dedicated inter-network node CLI measurement sessions may correspond to the neighboring network nodes that may have non-compatible beam pairs during the periodic full beam sweep-based measurement sessions. Further, the subset of transmit beams or receive beams to be measured in the dedicated inter-network node CLI reference signal measurement session may correspond to the non-compatible beam pairs.

Figure 12:
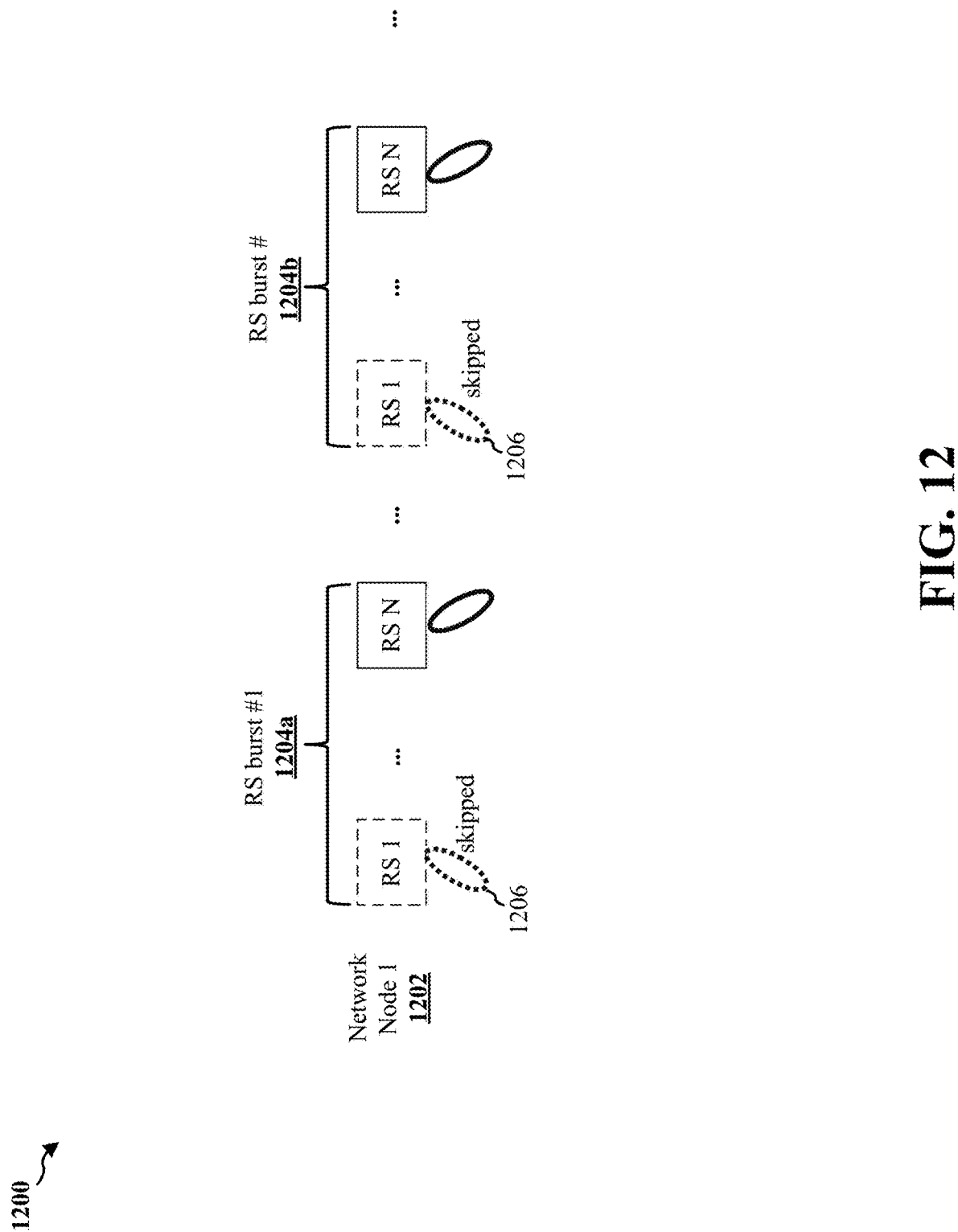
FIG. 12 is a diagram illustrating an example scheduling configuration for transmission and/or reception of reference signals for inter-network node CLI measurement according to one or more aspects.

FIG. 12 is a diagram 1200 illustrating an example scheduling configuration for transmission and/or reception of reference signals for inter-network node CLI measurement according to one or more aspects. In one or more configurations, a network node may transmit reference signals for CLI measurement based on an event (e.g., a trigger). In each transmit occasion (e.g., as described in detail above), a network node scheduled to transmit a reference signal may dynamically skip the transmission of the reference signal if the corresponding beam has not suffered from or caused CLI for a sufficiently long period (e.g., a period greater than a threshold). For example, the transmit beam 1206 may not have suffered from or caused CLI for a sufficiently long period. Accordingly, during both the reference signal burst #1 1204a and the reference signal burst #2 1204b, the network node #1 1202 may skip the transmission of the reference signal associated with the transmit beam 1206.

In one or more configurations, a network node may or may not indicate the skipping of transmission of a reference signal to the neighboring network nodes. In some examples, a neighboring network node may not perform reference signal measurement at the reference signal occasion associated with the skipped reference signal. In some examples, a neighboring network node may still perform reference signal measurement at the reference signal occasion associated with the skipped reference signal.

Figure 13:
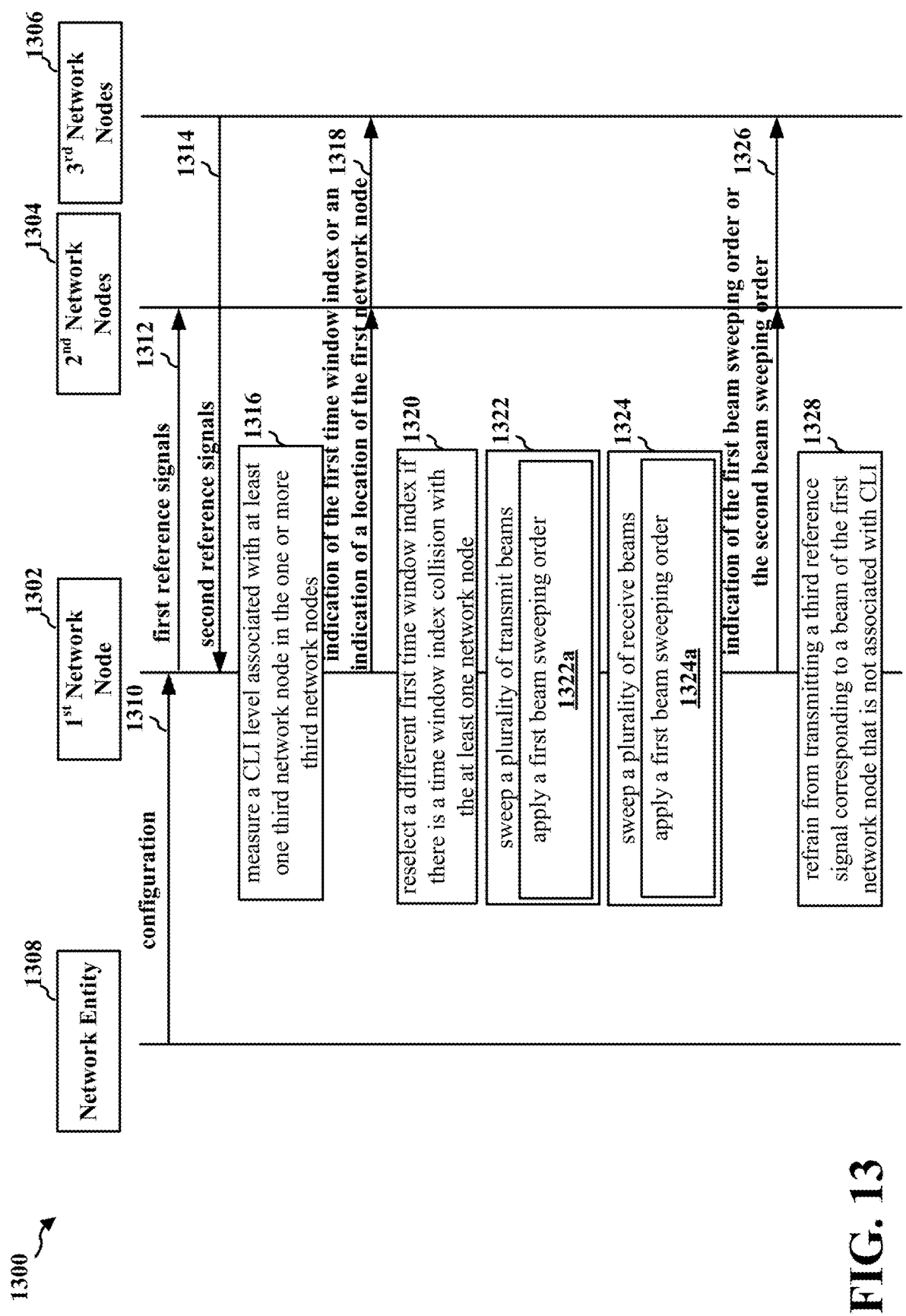
FIG. 13 is a diagram of a communication flow of a method of wireless communication.

FIG. 13 is a diagram of a communication flow 1300 of a method of wireless communication. At 1310, the first network node 1302 may receive, from a network entity 1308 different from the first network node 1302, a configuration associated with the transmission of the one or more first reference signals 1312 or the reception of the one or more second reference signals 1314.

At 1312, the first network node 1302 may transmit, to one or more second network nodes 1304, one or more first reference signals.

At 1314, the first network node 1302 may receive, from one or more third network nodes 1306, one or more second reference signals.

In one configuration, the one or more second network nodes 1304 and the one or more third network nodes 1306 may include at least one same network node.

In one configuration, the one or more second network nodes 1304 and the one or more third network nodes 1306 may not include any same network node.

At 1316, the first network node 1302 may measure a CLI level associated with at least one third network node in the one or more third network nodes 1306 based on the one or more second reference signals 1314.

In one configuration, the one or more first reference signals 1312 may be transmitted over one or more cycles. Each cycle in the one or more cycles may include a plurality of time windows. In each cycle in the one or more cycles, at least one first reference signal in the one or more first reference signals 1312 may be transmitted by the first network node 1302 during a single first time window associated with the first network node 1302.

In one configuration, the first time window may be associated with a same first time window index specific to the first network node 1302 in each cycle in the one or more cycles. No network node other than the first network node 1302 may transmit any reference signal during the first time window.

In one configuration, the first time window index may be selected by the first network node 1302.

At 1318, the first network node 1302 may transmit, to at least one network node in the one or more second network nodes 1304 or the one or more third network nodes 1306, an indication of the first time window index or an indication of a location of the first network node 1302.

At 1320, the first network node 1302 may reselect a different first time window index if there is a time window index collision with the at least one network node.

In one configuration, the first time window index may be selected by a network entity (e.g., the network entity 1308) different from the first network node 1302.

In one configuration, in each cycle in the one or more cycles, the first time window may be randomly selected by the first network node 1302.

In one configuration, the measurement of the CLI level associated with the at least one third network node may be based on a highest signal strength associated with the at least one third network node over the one or more cycles.

In one configuration, in each cycle in the one or more cycles, at least some second reference signals of the one or more second reference signals 1314 may be received by the first network node 1302 during one or more time windows other than the first time window.

In one configuration, the one or more second reference signals 1314 may be received over one or more cycles. Each cycle in the one or more cycles may include a plurality of time windows. In each cycle in the one or more cycles, at least one second reference signal in the one or more second reference signals 1314 may be received by the first network node 1302 during a single first time window associated with the first network node 1302.

In one configuration, the first time window may be associated with a same first time window index specific to the first network node 1302 over the one or more cycles.

In one configuration, in each cycle in the one or more cycles, the first time window may be randomly selected by the first network node 1302.

In one configuration, in each cycle in the one or more cycles, at least some first reference signals of the one or more first reference signals 1312 may be transmitted by the first network node 1302 during one or more time windows other than the first time window.

At 1322, the first network node 1302 may sweep a plurality of transmit beams for transmission of at least some first reference signals of the one or more first reference signals 1312.

At 1322a, the first network node 1302 may apply, in a first reference signal burst in the one or more reference signal bursts, a first beam sweeping order associated with the sweeping of the plurality of transmit beams or the sweeping of the plurality of receive beams.

At 1324, the first network node 1302 may sweep a plurality of receive beams for reception of at least some second reference signals of the one or more second reference signals 1314. Transmission of at least one first reference signal may overlap in time with reception of at least one second reference signal.

At 1324a, the first network node 1302 may apply, in a second reference signal burst in the one or more reference signal bursts, a second beam sweeping order associated with the sweeping of the plurality of transmit beams or the sweeping of the plurality of receive beams. The first beam sweeping order may be different from the second beam sweeping order.

In one configuration, a first level of interference caused by a first transmit beam of the first network node 1302 to a first receive beam of the first network node 1302 in the first reference signal burst may be greater than a threshold. A second level of interference caused by the first transmit beam of the first network node 1302 to the first receive beam of the first network node 1302 in the second reference signal burst may be less than the threshold.

At 1326, the first network node 1302 may transmit, to at least one network node in the one or more second network nodes 1304 or the one or more third network nodes 1306, an indication of the first beam sweeping order or the second beam sweeping order.

In one configuration, at least one first reference signal in the one or more first reference signals 1312 may be transmitted to at least one second network node in the one or more second network nodes 1304 based on a non-compatible beam pair.

In one configuration, at least one second reference signal in the one or more second reference signals 1314 may be received from the at least one third network node in the one or more third network nodes 1306 based on a non-compatible beam pair.

In one configuration, transmission of a subset of the one or more first reference signals 1312 or reception of a subset of the one or more second reference signals 1314 may be based on an event.

At 1328, the first network node 1302 may refrain from transmitting a third reference signal corresponding to a beam of the first network node 1302 that is not associated with CLI.

Figure 14:
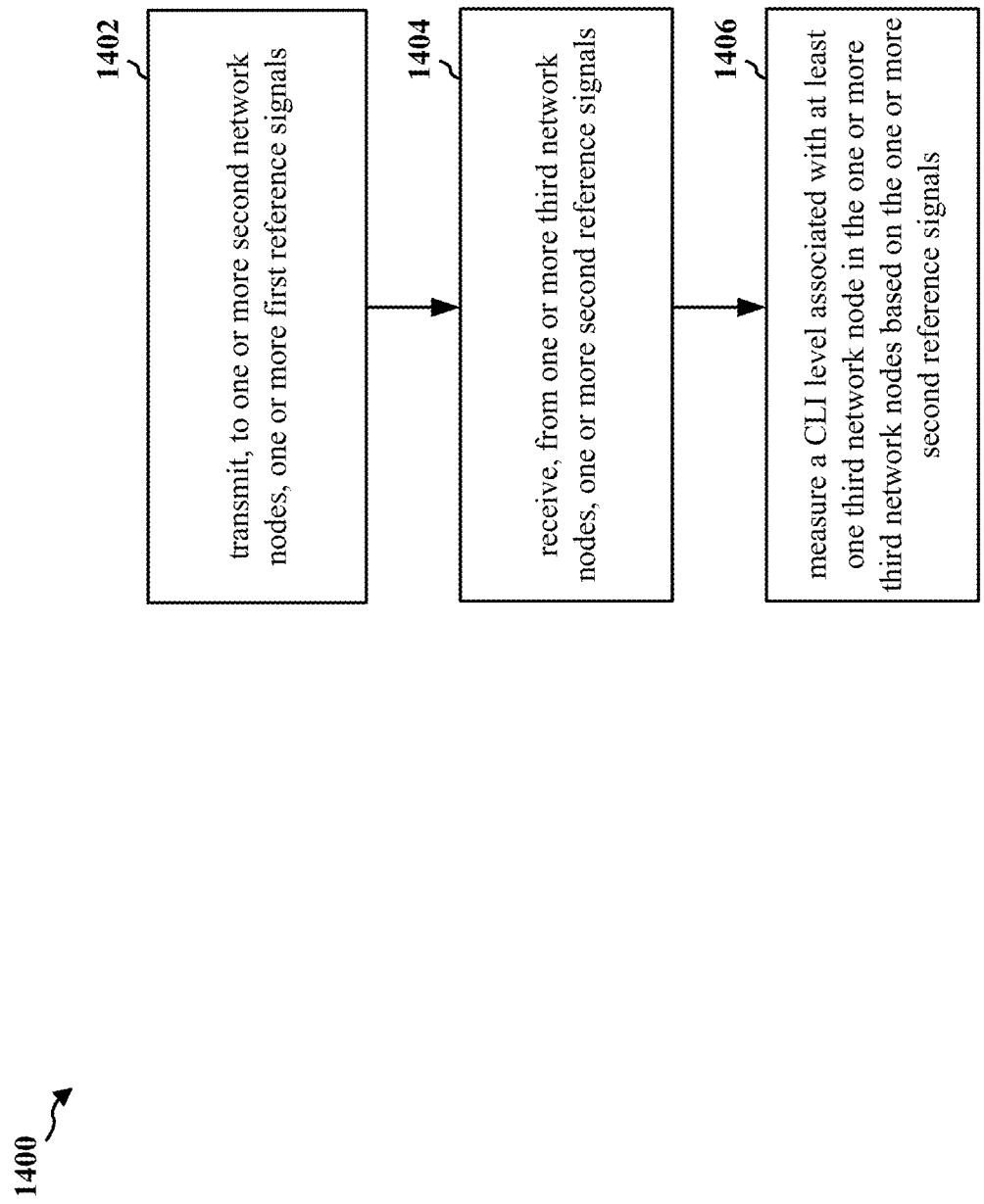
FIG. 14 is a flowchart of a method of wireless communication.

FIG. 14 is a flowchart 1400 of a method of wireless communication. The method may be performed by a first network node (e.g., the base station/first network node 102/180/310/614/1302; the apparatus 1602). At 1402, the first network node may transmit, to one or more second network nodes, one or more first reference signals. For example, 1402 may be performed by the CLI component 1640 in FIG. 16. Referring to FIG. 13, at 1312, the first network node 1302 may transmit, to one or more second network nodes 1304, one or more first reference signals.

At 1404, the first network node may receive, from one or more third network nodes, one or more second reference signals. For example, 1404 may be performed by the CLI component 1640 in FIG. 16. Referring to FIG. 13, at 1314, the first network node 1302 may receive, from one or more third network nodes 1306, one or more second reference signals.

At 1406, the first network node may measure a CLI level associated with at least one third network node in the one or more third network nodes based on the one or more second reference signals. For example, 1406 may be performed by the CLI component 1640 in FIG. 16. Referring to FIG. 13, at 1316, the first network node 1302 may measure a CLI level associated with at least one third network node in the one or more third network nodes 1306 based on the one or more second reference signals 1314.

Figure 15:
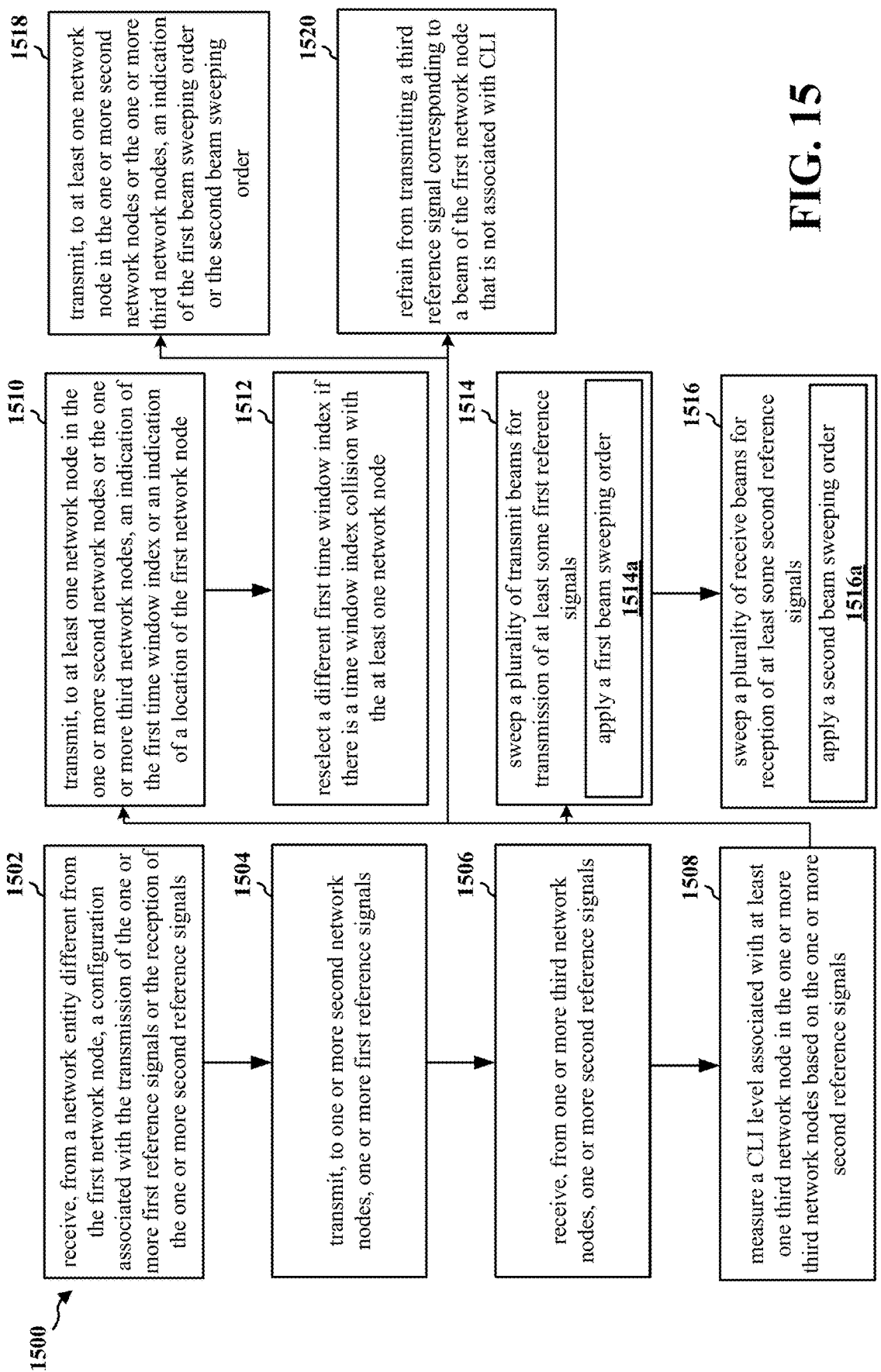
FIG. 15 is a flowchart of a method of wireless communication.

FIG. 15 is a flowchart 1500 of a method of wireless communication. The method may be performed by a first network node (e.g., the base station/first network node 102/180/310/1302; the apparatus 1602). At 1504, the first network node may transmit, to one or more second network nodes, one or more first reference signals. For example, 1504 may be performed by the CLI component 1640 in FIG. 16. Referring to FIG. 13, at 1312, the first network node 1302 may transmit, to one or more second network nodes 1304, one or more first reference signals.

At 1506, the first network node may receive, from one or more third network nodes, one or more second reference signals. For example, 1506 may be performed by the CLI component 1640 in FIG. 16. Referring to FIG. 13, at 1314, the first network node 1302 may receive, from one or more third network nodes 1306, one or more second reference signals.

At 1508, the first network node may measure a CLI level associated with at least one third network node in the one or more third network nodes based on the one or more second reference signals. For example, 1508 may be performed by the CLI component 1640 in FIG. 16. Referring to FIG. 13, at 1316, the first network node 1302 may measure a CLI level associated with at least one third network node in the one or more third network nodes 1306 based on the one or more second reference signals 1314.

In one configuration, referring to FIG. 13, the one or more first reference signals 1312 may be transmitted over one or more cycles. Each cycle in the one or more cycles may include a plurality of time windows. In each cycle in the one or more cycles, at least one first reference signal in the one or more first reference signals 1312 may be transmitted by the first network node 1302 during a single first time window associated with the first network node 1302.

In one configuration, referring to FIG. 13, the first time window may be associated with a same first time window index specific to the first network node 1302 in each cycle in the one or more cycles. No network node other than the first network node 1302 may transmit any reference signal during the first time window.

In one configuration, referring to FIG. 13, the first time window index may be selected by the first network node 1302.

In one configuration, referring to FIG. 13, the first time window index may be selected by a network entity (e.g., the network entity 1308) different from the first network node 1302.

In one configuration, at 1510, the first network node may transmit, to at least one network node in the one or more second network nodes or the one or more third network nodes, an indication of the first time window index or an indication of a location of the first network node. For example, 1510 may be performed by the CLI component 1640 in FIG. 16. Referring to FIG. 13, at 1318, the first network node 1302 may transmit, to at least one network node in the one or more second network nodes 1304 or the one or more third network nodes 1306, an indication of the first time window index or an indication of a location of the first network node 1302.

At 1512, the first network node may reselect a different first time window index if there is a time window index collision with the at least one network node. For example, 1512 may be performed by the CLI component 1640 in FIG. 16. Referring to FIG. 13, at 1320, the first network node 1302 may reselect a different first time window index if there is a time window index collision with the at least one network node.

In one configuration, referring to FIG. 13, in each cycle in the one or more cycles, the first time window may be randomly selected by the first network node 1302.

In one configuration, the measurement of the CLI level associated with the at least one third network node may be based on a highest signal strength associated with the at least one third network node over the one or more cycles.

In one configuration, referring to FIG. 13, in each cycle in the one or more cycles, at least some second reference signals of the one or more second reference signals 1314 may be received by the first network node 1302 during one or more time windows other than the first time window.

In one configuration, referring to FIG. 13, the one or more second reference signals 1314 may be received over one or more cycles. Each cycle in the one or more cycles may include a plurality of time windows. In each cycle in the one or more cycles, at least one second reference signal in the one or more second reference signals 1314 may be received by the first network node 1302 during a single first time window associated with the first network node 1302.

In one configuration, referring to FIG. 13, the first time window may be associated with a same first time window index specific to the first network node 1302 over the one or more cycles.

In one configuration, referring to FIG. 13, in each cycle in the one or more cycles, the first time window may be randomly selected by the first network node 1302.

In one configuration, referring to FIG. 13, in each cycle in the one or more cycles, at least some first reference signals of the one or more first reference signals 1312 may be transmitted by the first network node 1302 during one or more time windows other than the first time window.

In one configuration, in each reference signal burst in one or more reference signal bursts, at 1514, the first network node may sweep a plurality of transmit beams for transmission of at least some first reference signals of the one or more first reference signals. For example, 1514 may be performed by the CLI component 1640 in FIG. 16. Referring to FIG. 13, at 1322, the first network node 1302 may sweep a plurality of transmit beams for transmission of at least some first reference signals of the one or more first reference signals 1312.

At 1516, the first network node may sweep a plurality of receive beams for reception of at least some second reference signals of the one or more second reference signals. Transmission of at least one first reference signal may overlap in time with reception of at least one second reference signal. For example, 1516 may be performed by the CLI component 1640 in FIG. 16. Referring to FIG. 13, at 1324, the first network node 1302 may sweep a plurality of receive beams for reception of at least some second reference signals of the one or more second reference signals 1314.

In one configuration, at 1514a, the first network node may apply, in a first reference signal burst in the one or more reference signal bursts, a first beam sweeping order associated with the sweeping of the plurality of transmit beams or the sweeping of the plurality of receive beams. For example, 1514a may be performed by the CLI component 1640 in FIG. 16. Referring to FIG. 13, at 1322a, the first network node 1302 may apply, in a first reference signal burst in the one or more reference signal bursts, a first beam sweeping order associated with the sweeping of the plurality of transmit beams or the sweeping of the plurality of receive beams.

At 1516a, the first network node may apply, in a second reference signal burst in the one or more reference signal bursts, a second beam sweeping order associated with the sweeping of the plurality of transmit beams or the sweeping of the plurality of receive beams. The first beam sweeping order may be different from the second beam sweeping order. For example, 1516a may be performed by the CLI component 1640 in FIG. 16. Referring to FIG. 13, at 1324a, the first network node 1302 may apply, in a second reference signal burst in the one or more reference signal bursts, a second beam sweeping order associated with the sweeping of the plurality of transmit beams or the sweeping of the plurality of receive beams.

In one configuration, referring to FIG. 13, a first level of interference caused by a first transmit beam of the first network node 1302 to a first receive beam of the first network node 1302 in the first reference signal burst may be greater than a threshold. A second level of interference caused by the first transmit beam of the first network node 1302 to the first receive beam of the first network node 1302 in the second reference signal burst may be less than the threshold.

In one configuration, at 1518, the first network node may transmit, to at least one network node in the one or more second network nodes or the one or more third network nodes, an indication of the first beam sweeping order or the second beam sweeping order. For example, 1518 may be performed by the CLI component 1640 in FIG. 16. Referring to FIG. 13, at 1326, the first network node 1302 may transmit, to at least one network node in the one or more second network nodes 1304 or the one or more third network nodes 1306, an indication of the first beam sweeping order or the second beam sweeping order.

In one configuration, referring to FIG. 13, at least one first reference signal in the one or more first reference signals 1312 may be transmitted to at least one second network node in the one or more second network nodes 1304 based on a non-compatible beam pair.

In one configuration, referring to FIG. 13, at least one second reference signal in the one or more second reference signals 1314 may be received from the at least one third network node in the one or more third network nodes 1306 based on a non-compatible beam pair.

In one configuration, referring to FIG. 13, transmission of a subset of the one or more first reference signals 1312 or reception of a subset of the one or more second reference signals 1314 may be based on an event.

In one configuration, at 1520, the first network node may refrain from transmitting a third reference signal corresponding to a beam of the first network node that is not associated with CLI. For example, 1520 may be performed by the CLI component 1640 in FIG. 16. Referring to FIG. 13, at 1328, the first network node 1302 may refrain from transmitting a third reference signal corresponding to a beam of the first network node 1302 that is not associated with CLI.

In one configuration, referring to FIG. 13, the one or more second network nodes 1304 and the one or more third network nodes 1306 may include at least one same network node.

In one configuration, referring to FIG. 13, the one or more second network nodes 1304 and the one or more third network nodes 1306 may not include any same network node.

In one configuration, at 1502, the first network node may receive, from a network entity different from the first network node, a configuration associated with the transmission of the one or more first reference signals or the reception of the one or more second reference signals. For example, 1502 may be performed by the CLI component 1640 in FIG. 16. Referring to FIG. 13, at 1310, the first network node 1302 may receive, from a network entity 1308 different from the first network node 1302, a configuration associated with the transmission of the one or more first reference signals 1312 or the reception of the one or more second reference signals 1314.

Figure 16:
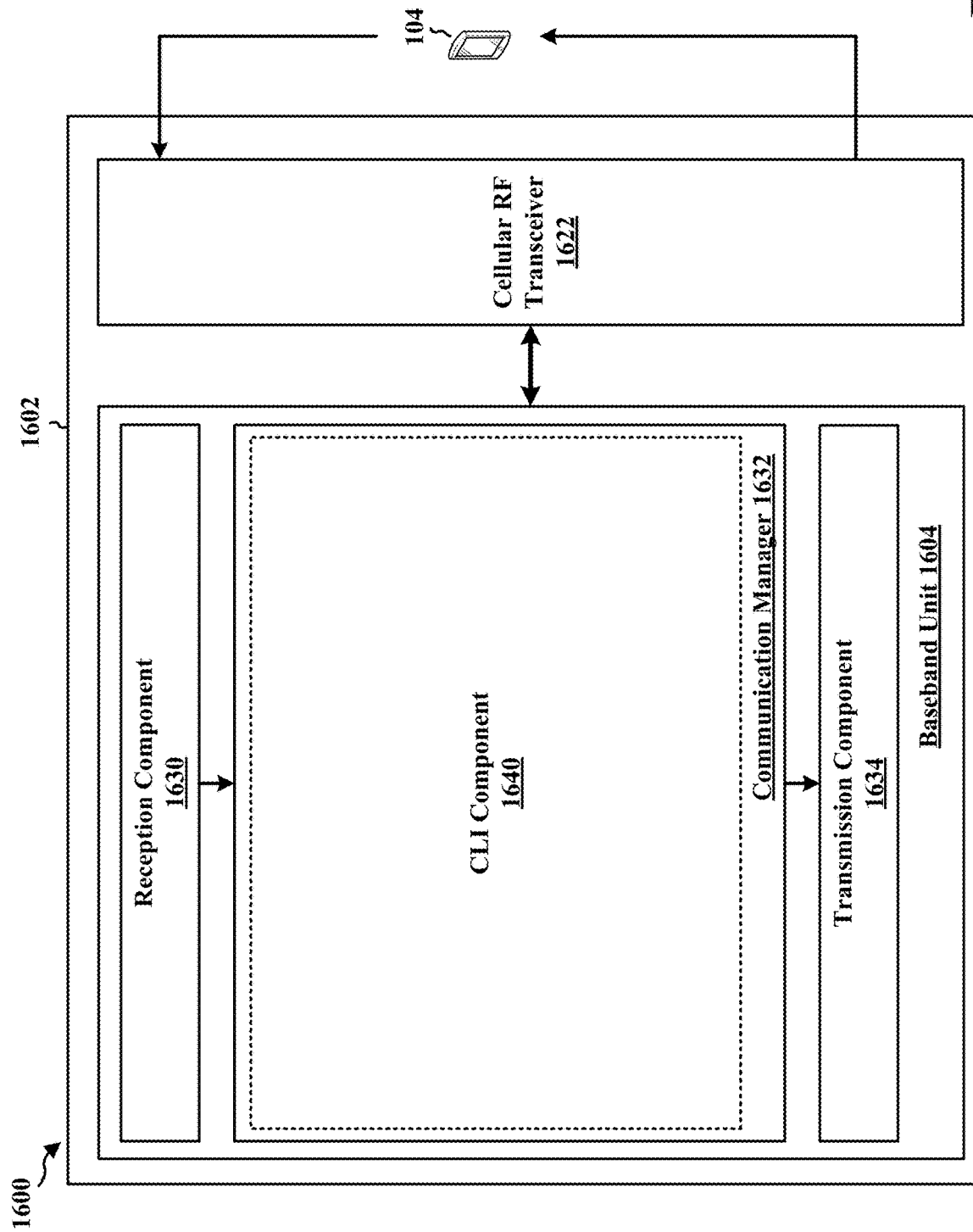
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a CLI component 1640 that may be configured to receive, from a network entity different from the first network node, a configuration associated with the transmission of the one or more first reference signals or the reception of the one or more second reference signals, e.g., as described in connection with 1502 in FIG. 15. The CLI component 1640 may be configured to transmit, to one or more second network nodes, one or more first reference signals, e.g., as described in connection with 1402 in FIGS. 14 and 1504 in FIG. 15. The CLI component 1640 may be configured to receive, from one or more third network nodes, one or more second reference signals, e.g., as described in connection with 1404 in FIGS. 14 and 1506 in FIG. 15. The CLI component 1640 may be configured to measure a CLI level associated with at least one third network node in the one or more third network nodes based on the one or more second reference signals, e.g., as described in connection with 1406 in FIGS. 14 and 1508 in FIG. 15. The CLI component 1640 may be configured to transmit, to at least one network node in the one or more second network nodes or the one or more third network nodes, an indication of the first time window index or an indication of a location of the first network node, e.g., as described in connection with 1510 in FIG. 15. The CLI component 1640 may be configured to reselect a different first time window index if there is a time window index collision with the at least one network node, e.g., as described in connection with 1512 in FIG. 15. The CLI component 1640 may be configured to sweep a plurality of transmit beams for transmission of at least some first reference signals of the one or more first reference signals, e.g., as described in connection with 1514 in FIG. 15. The CLI component 1640 may be configured to apply, in a first reference signal burst in the one or more reference signal bursts, a first beam sweeping order associated with the sweeping of the plurality of transmit beams or the sweeping of the plurality of receive beams, e.g., as described in connection with 1514*a* in FIG. 15. The CLI component 1640 may be configured to sweep a plurality of receive beams for reception of at least some second reference signals of the one or more second reference signals, e.g., as described in connection with 1516 in FIG. 15. The CLI component 1640 may be configured to apply, in a second reference signal burst in the one or more reference signal bursts, a second beam sweeping order associated with the sweeping of the plurality of transmit beams or the sweeping of the plurality of receive beams, e.g., as described in connection with 1516*a* in FIG. 15. The CLI component 1640 may be configured to transmit, to at least one network node in the one or more second network nodes or the one or more third network nodes, an indication of the first beam sweeping order or the second beam sweeping order, e.g., as described in connection with 1518 in FIG. 15. The CLI component

1640 may be configured to refrain from transmitting a third reference signal corresponding to a beam of the first network node that is not associated with CLI, e.g., as described in connection with 1520 in FIG. 15.

The apparatus may include additional components that perform each of the blocks of the algorithm in the flowcharts of FIGS. 13-15. As such, each block in the flowcharts of FIGS. 13-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for transmitting, to one or more second network nodes, one or more first reference signals. The apparatus 1602, and in particular the baseband unit 1604, includes means for receiving, from one or more third network nodes, one or more second reference signals. The apparatus 1602, and in particular the baseband unit 1604, includes means for measuring a CLI level associated with at least one third network node in the one or more third network nodes based on the one or more second reference signals.

In one configuration, the one or more first reference signals may be transmitted over one or more cycles. Each cycle in the one or more cycles may include a plurality of time windows. In each cycle in the one or more cycles, at least one first reference signal in the one or more first reference signals may be transmitted by the first network node during a single first time window associated with the first network node. In one configuration, the first time window may be associated with a same first time window index specific to the first network node in each cycle in the one or more cycles. No network node other than the first network node may transmit any reference signal during the first time window. In one configuration, the first time window index may be selected by the first network node. In one configuration, the first time window index may be selected by a network entity different from the first network node. In one configuration, the apparatus 1602, and in particular the baseband unit 1604, includes means for transmitting, to at least one network node in the one or more second network nodes or the one or more third network nodes, an indication of the first time window index or an indication of a location of the first network node. The apparatus 1602, and in particular the baseband unit 1604, includes means for reselecting a different first time window index if there is a time window index collision with the at least one network node. In one configuration, in each cycle in the one or more cycles, the first time window may be randomly selected by the first network node. In one configuration, the measurement of the CLI level associated with the at least one third network node may be based on a highest signal strength associated with the at least one third network node over the one or more cycles. In one configuration, in each cycle in the one or more cycles, at least some second reference signals of the one or more second reference signals may be received by the first network node during one or more time windows other than the first time window. In one configuration, the one or more second reference signals may be received over one or more cycles. Each cycle in the one or more cycles may include a plurality of time windows. In each cycle in the one or more cycles, at least one second reference signal in the one or more second reference signals may be received by the first network node during a single first time window associated with the first network node. In one configuration, the first time window may be associated with a same first time window index specific to the first network node over the one or more cycles. In one configuration, in each cycle in the one or more cycles, the first time window may be randomly selected by the first network node. In one configuration, in each cycle in the one or more cycles, at least some first reference signals of the one or more first reference signals may be transmitted by the first network node during one or more time windows other than the first time window. In one configuration, in each reference signal burst in one or more reference signal bursts, the apparatus 1602, and in particular the baseband unit 1604, includes means for sweeping a plurality of transmit beams for transmission of at least some first reference signals of the one or more first reference signals. The apparatus 1602, and in particular the baseband unit 1604, includes means for sweeping a plurality of receive beams for reception of at least some second reference signals of the one or more second reference signals. Transmission of at least one first reference signal may overlap in time with reception of at least one second reference signal. In one configuration, the apparatus 1602, and in particular the baseband unit 1604, includes means for applying, in a first reference signal burst in the one or more reference signal bursts, a first beam sweeping order associated with the sweeping of the plurality of transmit beams or the sweeping of the plurality of receive beams. The apparatus 1602, and in particular the baseband unit 1604, includes means for applying, in a second reference signal burst in the one or more reference signal bursts, a second beam sweeping order associated with the sweeping of the plurality of transmit beams or the sweeping of the plurality of receive beams. The first beam sweeping order may be different from the second beam sweeping order. In one configuration, a first level of interference caused by a first transmit beam of the first network node to a first receive beam of the first network node in the first reference signal burst may be greater than a threshold. A second level of interference caused by the first transmit beam of the first network node to the first receive beam of the first network node in the second reference signal burst may be less than the threshold. In one configuration, the apparatus 1602, and in particular the baseband unit 1604, includes means for transmitting, to at least one network node in the one or more second network nodes or the one or more third network nodes, an indication of the first beam sweeping order or the second beam sweeping order. In one configuration, at least one first reference signal in the one or more first reference signals may be transmitted to at least one second network node in the one or more second network nodes based on a non-compatible beam pair. In one configuration, at least one second reference signal in the one or more second reference signals may be received from the at least one third network node in the one or more third network nodes based on a non-compatible beam pair. In one configuration, transmission of a subset of the one or more first reference signals or reception of a subset of the one or more second reference signals may be based on an event. In one configuration, the apparatus 1602, and in particular the baseband unit 1604, includes means for refraining from transmitting a third reference signal corresponding to a beam of the first network node that is not associated with CLI. In one configuration, the one or more second network nodes and the one or more third network nodes may include at least one same network node. In one configuration, the one or more second network nodes and the one or more third network nodes may not include any same network node. In one configuration, the apparatus 1602, and in particular the baseband unit 1604, includes means for receiving, from a network entity different from the first network node, a configuration associated with the transmission of the one or more first reference signals or the reception of the one or more second reference signals.

The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-16, a first network node may transmit, to one or more second network nodes, one or more first reference signals. The first network node may receive, from one or more third network nodes, one or more second reference signals. The first network node may measure a CLI level associated with at least one third network node in the one or more third network nodes based on the one or more second reference signals. Accordingly, network nodes may measure the CLI cause by the network nodes operating in the full-duplex mode.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first network node including at least one processor coupled to a memory and configured to transmit, to one or more second network nodes, one or more first reference signals; receive, from one or more third network nodes, one or more second reference signals; and measure a CLI level associated with at least one third network node in the one or more third network nodes based on the one or more second reference signals.

Aspect 2 is the apparatus of aspect 1, where the one or more first reference signals are transmitted over one or more cycles, each cycle in the one or more cycles includes a plurality of time windows, and in each cycle in the one or more cycles, at least one first reference signal in the one or more first reference signals is transmitted by the first network node during a single first time window associated with the first network node.

Aspect 3 is the apparatus of aspect 2, where the first time window is associated with a same first time window index specific to the first network node in each cycle in the one or more cycles, and no network node other than the first network node transmits any reference signal during the first time window.

Aspect 4 is the apparatus of aspect 3, where the first time window index is selected by the first network node.

Aspect 5 is the apparatus of aspect 3, where the first time window index is selected by a network entity different from the first network node.

Aspect 6 is the apparatus of any of aspects 3 and 4, the at least one processor being further configured to: transmit, to at least one network node in the one or more second network nodes or the one or more third network nodes, an indication of the first time window index or an indication of a location of the first network node; and reselect a different first time window index if there is a time window index collision with the at least one network node.

Aspect 7 is the apparatus of aspect 2, where in each cycle in the one or more cycles, the first time window is randomly selected by the first network node.

Aspect 8 is the apparatus of aspect 7, where the measurement of the CLI level associated with the at least one third network node is based on a highest signal strength associated with the at least one third network node over the one or more cycles.

Aspect 9 is the apparatus of any of aspects 2 to 8, where in each cycle in the one or more cycles, at least some second reference signals of the one or more second reference signals are received by the first network node during one or more time windows other than the first time window.

Aspect 10 is the apparatus of aspect 1, where the one or more second reference signals are received over one or more cycles, each cycle in the one or more cycles includes a plurality of time windows, and in each cycle in the one or more cycles, at least one second reference signal in the one or more second reference signals is received by the first network node during a single first time window associated with the first network node.

Aspect 11 is the apparatus of aspect 10, where the first time window is associated with a same first time window index specific to the first network node over the one or more cycles.

Aspect 12 is the apparatus of aspect 10, where in each cycle in the one or more cycles, the first time window is randomly selected by the first network node.

Aspect 13 is the apparatus of any of aspects 10 to 12, where in each cycle in the one or more cycles, at least some first reference signals of the one or more first reference signals are transmitted by the first network node during one or more time windows other than the first time window.

Aspect 14 is the apparatus of aspect 1, where in each reference signal burst in one or more reference signal bursts, the at least one processor is configured to: sweep a plurality of transmit beams for transmission of at least some first reference signals of the one or more first reference signals; and sweep a plurality of receive beams for reception of at least some second reference signals of the one or more second reference signals, transmission of at least one first reference signal overlapping in time with reception of at least one second reference signal.

Aspect 15 is the apparatus of aspect 14, the at least one processor being further configured to: apply, in a first reference signal burst in the one or more reference signal bursts, a first beam sweeping order associated with the sweeping of the plurality of transmit beams or the sweeping of the plurality of receive beams; and apply, in a second reference signal burst in the one or more reference signal bursts, a second beam sweeping order associated with the sweeping of the plurality of transmit beams or the sweeping of the plurality of receive beams, the first beam sweeping order being different from the second beam sweeping order.

Aspect 16 is the apparatus of aspect 15, where a first level of interference caused by a first transmit beam of the first network node to a first receive beam of the first network node in the first reference signal burst is greater than a threshold, and a second level of interference caused by the first transmit beam of the first network node to the first receive beam of the first network node in the second reference signal burst is less than the threshold.

Aspect 17 is the apparatus of any of aspects 15 and 16, the at least one processor being further configured to: transmit, to at least one network node in the one or more second network nodes or the one or more third network nodes, an indication of the first beam sweeping order or the second beam sweeping order.

Aspect 18 is the apparatus of aspect 1, where at least one first reference signal in the one or more first reference signals is transmitted to at least one second network node in the one or more second network nodes based on a non-compatible beam pair.

Aspect 19 is the apparatus of aspect 1, where at least one second reference signal in the one or more second reference signals is received from the at least one third network node in the one or more third network nodes based on a non-compatible beam pair.

Aspect 20 is the apparatus of aspect 1, where transmission of a subset of the one or more first reference signals or reception of a subset of the one or more second reference signals is based on an event.

Aspect 21 is the apparatus of aspect 20, the at least one processor being further configured to: refrain from transmitting a third reference signal corresponding to a beam of the first network node that is not associated with CLI.

Aspect 22 is the apparatus of any of aspects 1 to 21, where the one or more second network nodes and the one or more third network nodes include at least one same network node.

Aspect 23 is the apparatus of any of aspects 1 to 21, where the one or more second network nodes and the one or more third network nodes do not include any same network node.

Aspect 24 is the apparatus of any of aspects 1 to 23, the at least one processor being further configured to: receive, from a network entity different from the first network node, a configuration associated with the transmission of the one or more first reference signals or the reception of the one or more second reference signals.

Aspect 25 is the apparatus of any of aspects 1 to 24, further including a transceiver coupled to the at least one processor.

Aspect 26 is a method of wireless communication for implementing any of aspects 1 to 25.

Aspect 27 is an apparatus for wireless communication including means for implementing any of aspects 1 to 25.

Aspect 28 is a computer-readable medium storing computer executable code, where the code when executed by a processor causes the processor to implement any of aspects 1 to 25.

What is claimed is:

1. An apparatus for wireless communication at a first network node, comprising:
   a memory; and
   at least one processor coupled to the memory and configured to:
      transmit, to one or more second network nodes, one or more first reference signals;
      receive, from one or more third network nodes, one or more second reference signals; and
      measure a cross link interference (CLI) level associated with at least one third network node in the one or more third network nodes based on the one or more second reference signals,
   wherein the one or more second reference signals are received over one or more cycles, each cycle in the one or more cycles includes a plurality of time windows, and in each cycle in the one or more cycles, at least one second reference signal in the one or more second reference signals is received by the first network node during a single first time window associated with the first network node, and wherein:
      the first time window is associated with a same first time window index specific to the first network node over the one or more cycles, or
      in each cycle in the one or more cycles, the first time window is randomly selected by the first network node.

2. The apparatus of claim 1, wherein the one or more first reference signals are transmitted over one or more cycles, each cycle in the one or more cycles includes a plurality of time windows, and in each cycle in the one or more cycles, at least one first reference signal in the one or more first reference signals is transmitted by the first network node during a single first time window associated with the first network node.

3. The apparatus of claim 2, wherein the first time window is associated with a same first time window index specific to the first network node in each cycle in the one or more cycles, and no network node other than the first network node transmits any reference signal during the first time window.

4. The apparatus of claim 3, wherein the first time window index is selected by the first network node.

5. The apparatus of claim 3, wherein the first time window index is selected by a network entity different from the first network node.

6. The apparatus of claim 3, the at least one processor being further configured to:
    transmit, to at least one network node in the one or more second network nodes or the one or more third network nodes, an indication of the first time window index or an indication of a location of the first network node; and
    reselect a different first time window index if there is a time window index collision with the at least one network node.

7. The apparatus of claim 2, wherein in each cycle in the one or more cycles, the first time window is randomly selected by the first network node.

8. The apparatus of claim 7, wherein the measurement of the CLI level associated with the at least one third network node is based on a highest signal strength associated with the at least one third network node over the one or more cycles.

9. The apparatus of claim 2, wherein in each cycle in the one or more cycles, at least some second reference signals of the one or more second reference signals are received by the first network node during one or more time windows other than the first time window.

10. The apparatus of claim 1, wherein the first time window is associated with the same first time window index specific to the first network node over the one or more cycles.

11. The apparatus of claim 1, wherein in each cycle in the one or more cycles, the first time window is randomly selected by the first network node.

12. The apparatus of claim 1, wherein in each cycle in the one or more cycles, at least some first reference signals of the one or more first reference signals are transmitted by the first network node during one or more time windows other than the first time window.

13. The apparatus of claim 1, wherein in each reference signal burst in one or more reference signal bursts, the at least one processor is configured to:
    sweep a plurality of transmit beams for transmission of at least some first reference signals of the one or more first reference signals; and
    sweep a plurality of receive beams for reception of at least some second reference signals of the one or more second reference signals, transmission of at least one first reference signal overlapping in time with reception of at least one second reference signal.

14. The apparatus of claim 13, the at least one processor being further configured to:
    apply, in a first reference signal burst in the one or more reference signal bursts, a first beam sweeping order associated with the sweeping of the plurality of transmit beams or the sweeping of the plurality of receive beams; and
    apply, in a second reference signal burst in the one or more reference signal bursts, a second beam sweeping order associated with the sweeping of the plurality of transmit beams or the sweeping of the plurality of receive beams, the first beam sweeping order being different from the second beam sweeping order.

15. The apparatus of claim 14, wherein a first level of interference caused by a first transmit beam of the first network node to a first receive beam of the first network node in the first reference signal burst is greater than a threshold, and a second level of interference caused by the first transmit beam of the first network node to the first receive beam of the first network node in the second reference signal burst is less than the threshold.

16. The apparatus of claim 14, the at least one processor being further configured to:
    transmit, to at least one network node in the one or more second network nodes or the one or more third network nodes, an indication of the first beam sweeping order or the second beam sweeping order.

17. The apparatus of claim 1, wherein at least one first reference signal in the one or more first reference signals is transmitted to at least one second network node in the one or more second network nodes based on a non-compatible beam pair.

18. The apparatus of claim 1, wherein at least one second reference signal in the one or more second reference signals is received from the at least one third network node in the one or more third network nodes based on a non-compatible beam pair.

19. The apparatus of claim 1, wherein transmission of a subset of the one or more first reference signals or reception of a subset of the one or more second reference signals is based on an event.

20. The apparatus of claim 19, the at least one processor being further configured to:
    refrain from transmitting a third reference signal corresponding to a beam of the first network node that is not associated with CLI.

21. The apparatus of claim 1, wherein the one or more second network nodes and the one or more third network nodes include at least one same network node.

22. The apparatus of claim 1, wherein the one or more second network nodes and the one or more third network nodes do not include any same network node.

23. The apparatus of claim 1, the at least one processor being further configured to:
    receive, from a network entity different from the first network node, a configuration associated with the transmission of the one or more first reference signals or the reception of the one or more second reference signals.

24. The apparatus of claim 1, further comprising a transceiver coupled to the at least one processor.

25. A method of wireless communication at a first network node, comprising:
    transmitting, to one or more second network nodes, one or more first reference signals;
    receiving, from one or more third network nodes, one or more second reference signals; and
    measuring a cross link interference (CLI) level associated with at least one third network node in the one or more third network nodes based on the one or more second reference signals,
    wherein the one or more second reference signals are received over one or more cycles, each cycle in the one or more cycles includes a plurality of time windows, and in each cycle in the one or more cycles, at least one second reference signal in the one or more second reference signals is received by the first network node during a single first time window associated with the first network node, and wherein:
- the first time window is associated with a same first time window index specific to the first network node over the one or more cycles, or
- in each cycle in the one or more cycles, the first time window is randomly selected by the first network node.

26. The method of claim 25, wherein the one or more first reference signals are transmitted over one or more cycles, each cycle in the one or more cycles includes a plurality of time windows, and in each cycle in the one or more cycles, at least one first reference signal in the one or more first reference signals is transmitted by the first network node during a single first time window associated with the first network node.

27. The method of claim 26, wherein the first time window is associated with a same first time window index specific to the first network node in each cycle in the one or more cycles, and no network node other than the first network node transmits any reference signal during the first time window.

28. An apparatus for wireless communication at a first network node, comprising:
- means for transmitting, to one or more second network nodes, one or more first reference signals;
- means for receiving, from one or more third network nodes, one or more second reference signals; and
- means for measuring a cross link interference (CLI) level associated with at least one third network node in the one or more third network nodes based on the one or more second reference signals,
- wherein the one or more second reference signals are received over one or more cycles, each cycle in the one or more cycles includes a plurality of time windows, and in each cycle in the one or more cycles, at least one second reference signal in the one or more second reference signals is received by the first network node during a single first time window associated with the first network node, and wherein:
  - the first time window is associated with a same first time window index specific to the first network node over the one or more cycles, or
  - in each cycle in the one or more cycles, the first time window is randomly selected by the first network node.

29. A non-transitory computer-readable medium storing computer executable code at a first network node, the code when executed by a processor causes the processor to:
- transmit, to one or more second network nodes, one or more first reference signals;
- receive, from one or more third network nodes, one or more second reference signals; and
- measure a cross link interference (CLI) level associated with at least one third network node in the one or more third network nodes based on the one or more second reference signals,
- wherein the one or more second reference signals are received over one or more cycles, each cycle in the one or more cycles includes a plurality of time windows, and in each cycle in the one or more cycles, at least one second reference signal in the one or more second reference signals is received by the first network node during a single first time window associated with the first network node, and wherein:
  - the first time window is associated with a same first time window index specific to the first network node over the one or more cycles, or
  - in each cycle in the one or more cycles, the first time window is randomly selected by the first network node.

\* \* \* \* \*